US012749601B2

(12) United States Patent
Takamura et al.

(10) Patent No.: US 12,749,601 B2
(45) Date of Patent: Sep. 29, 2026

(54) LAMINATED VARISTOR

(71) Applicant: Panasonic Intellectual Property Management Co., Ltd., Osaka (JP)

(72) Inventors: Masashi Takamura, Hokkaido (JP); Ken Yanai, Hokkaido (JP); Yuji Yamagishi, Hokkaido (JP); Sayaka Watanabe, Hokkaido (JP); Yuto Akiyama, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 449 days.

(21) Appl. No.: 18/504,130

(22) Filed: Nov. 7, 2023

(65) Prior Publication Data

US 2024/0177895 A1 May 30, 2024

(30) Foreign Application Priority Data

Nov. 29, 2022 (JP) ................................ 2022-190472

(51) Int. Cl.
*H01C 7/112* (2006.01)
*H01C 1/142* (2006.01)

(52) U.S. Cl.
CPC ............. *H01C 7/112* (2013.01); *H01C 1/142* (2013.01)

(58) Field of Classification Search
CPC . H01C 7/18; H01C 1/00; H01C 7/003; H01C 7/112; H01C 1/142
See application file for complete search history.

(56) References Cited

U.S. PATENT DOCUMENTS 8,891,226 B2 * 11/2014 Lee ........................ H01G 4/232 361/321.1

FOREIGN PATENT DOCUMENTS

| | | | | |
|---|---|---|---|---|
| JP | H04125902 | * 4/1992 | | |
| JP | H04280603 | * 10/1992 | | |
| JP | 07-235406 | 9/1995 | | |
| WO | WO-2007054082 | * 5/2007 | ........... | H01C 7/1006 |

OTHER PUBLICATIONS

JP-H04125902 translation (Year: 1992).*
JP-H04280603 translation (Year: 1992).*
WO-2007054082 translation (Year: 2007).*

* cited by examiner

*Primary Examiner* — Kyung S Lee
(74) *Attorney, Agent, or Firm* — Rimon P.C.

(57) ABSTRACT

A first internal electrode includes a pair of first connecting parts extending from a first end surface along a first direction to be connected to a first external electrode, and a first facing part provided between the pair of first connecting parts. A second internal electrode includes a pair of second connecting parts extending from a second end surface along the first direction to be connected to a second external electrode, and a second facing part provided between the pair of second connecting parts. A third internal electrode includes a third facing part disposed along the first direction. The third facing part overlaps the first facing part and the second facing part. A first end of the third facing part is disposed between the pair of first connecting parts, and a second end of the third facing part is disposed between the pair of second connecting parts.

15 Claims, 10 Drawing Sheets

LAMINATED VARISTOR

BACKGROUND

1. Technical Field

The present disclosure relates to a laminated varistor. More specifically, the present disclosure relates to a laminated varistor having a sintered body having a laminated structure in which a plurality of layers are laminated.

2. Description of the Related Art

In recent years, miniaturization of home appliances and in-vehicle electronic devices has progressed, and a varistor which is a component thereof is also required to be miniaturized. In addition, as a frequency increases, an electrostatic capacitance affects performance, and thus, a varistor having a small electrostatic capacitance and a small variation thereof while ensuring a predetermined varistor voltage is required. In addition, in a case where varistors are used in pairs, in order to reduce a difference in electrostatic capacitance between the pairs, it has been proposed that two varistors are formed in one element.

Note that, for example, Unexamined Japanese Patent Publication No. 07-235406 is known as a related prior art document.

A chip capacitive varistor disclosed in Unexamined Japanese Patent Publication No. 07-235406 has a sintered body formed by laminating and firing four green sheets including a green sheet having a first internal electrode formed on almost the entire front surface and a green sheet having second and third internal electrodes respectively formed at both ends in a longitudinal direction of the front surface. Then, one capacitive varistor element is formed by the pair of the first internal electrode and the second internal electrode, and one capacitive varistor element is formed by the pair of the first internal electrode and the third internal electrode.

SUMMARY

In the chip capacitive varistor disclosed in Unexamined Japanese Patent Publication No. 07-235406, there is a problem that variations occur in the electrostatic capacitances of two capacitive varistor elements due to a manufacturing dimensional error or the like.

An object of the present disclosure is to provide a laminated varistor capable of reducing variations in electrostatic capacitance between two varistors.

A laminated varistor according to an aspect of the present disclosure includes a sintered body, a first internal electrode, a second internal electrode, and a third internal electrode that are provided inside the sintered body, a first external electrode, a second external electrode, and a third external electrode. The sintered body includes a first end surface and a second end surface facing each other in a first direction, a first side surface and a second side surface facing each other in a second direction intersecting the first direction, and a first principal surface and a second principal surface facing each other in a third direction intersecting the first direction and the second direction. The sintered body has a laminated structure in which a plurality of layers are laminated along the third direction. The first external electrode is provided on the first end surface to be connected to the first internal electrode. The second external electrode is provided on the second end surface to be connected to the second internal electrode. The third external electrode is provided on at least one of the first side surface and the second side surface to be connected to the third internal electrode. The first internal electrode includes a pair of first connecting parts and a first facing part. The pair of first connecting parts extends from the first end surface along the first direction and is connected to the first external electrode. The first facing part is disposed along the second direction and is provided between the pair of first connecting parts. The second internal electrode includes a pair of second connecting parts and a second facing part. The pair of second connecting parts extends from the second end surface along the first direction and is connected to the second external electrode. The second facing part is disposed along the second direction and is provided between the pair of second connecting parts. The third internal electrode includes a third facing part disposed along the first direction, and a third connecting part that connects the third external electrode provided on at least one of the first side surface and the second side surface and the third facing part. The third facing part overlaps a part of the first facing part and a part of the second facing part in the third direction. A first end of the third facing part in the first direction is disposed between the pair of first connecting parts, and a second end of the third facing part in the first direction is disposed between the pair of second connecting parts.

A laminated varistor according to another aspect of the present disclosure includes a sintered body, a first internal electrode, a second internal electrode, and a third internal electrode that are provided inside the sintered body, a first external electrode, a second external electrode, and a third external electrode. The sintered body includes a first end surface and a second end surface facing each other in a first direction, a first side surface and a second side surface facing each other in a second direction intersecting the first direction, and a first principal surface and a second principal surface facing each other in a third direction intersecting the first direction and the second direction. The sintered body has a laminated structure in which a plurality of layers are laminated along the third direction. The first external electrode is provided on the first end surface to be connected to the first internal electrode. The second external electrode is provided on the second end surface to be connected to the second internal electrode. The third external electrode is provided on at least one of the first side surface and the second side surface to be connected to the third internal electrode. The first internal electrode extends from the first end surface along the first direction. The second internal electrode extends from the second end surface along the first direction. The third internal electrode includes a pair of facing parts extending along the second direction, a first coupling part, a second coupling part, and a connecting part. The first coupling part couples first ends of the pair of facing parts close to the first side surface. The second coupling part couples second ends of the pair of facing parts close to the second side surface. The connecting part connects at least one of the first coupling part and the second coupling part and the third external electrode. In the third direction, at least a part of one of the pair of facing parts overlaps the first internal electrode, and at least a part of the other of the pair of facing parts overlaps the second internal electrode. Inside the sintered body, the second internal electrode is disposed at a position different from an overlapping range overlapping with the first internal electrode in the third direction. An end of the first internal electrode and an end of the second internal electrode are disposed between the first coupling part and the second coupling part.

According to the present disclosure, it is possible to reduce variations in electrostatic capacitance between two varistors.

DETAILED DESCRIPTIONS

Each of the drawings described in the following exemplary embodiments is a schematic view, and the ratio of the size and the thickness of each component in each drawing does not necessarily reflect the actual dimensional ratio.

(1) First Exemplary Embodiment

(1.1) Overview

Hereinafter, laminated varistor 1 according to a first exemplary embodiment of the present disclosure will be described with reference to the drawings.

Figure 1:
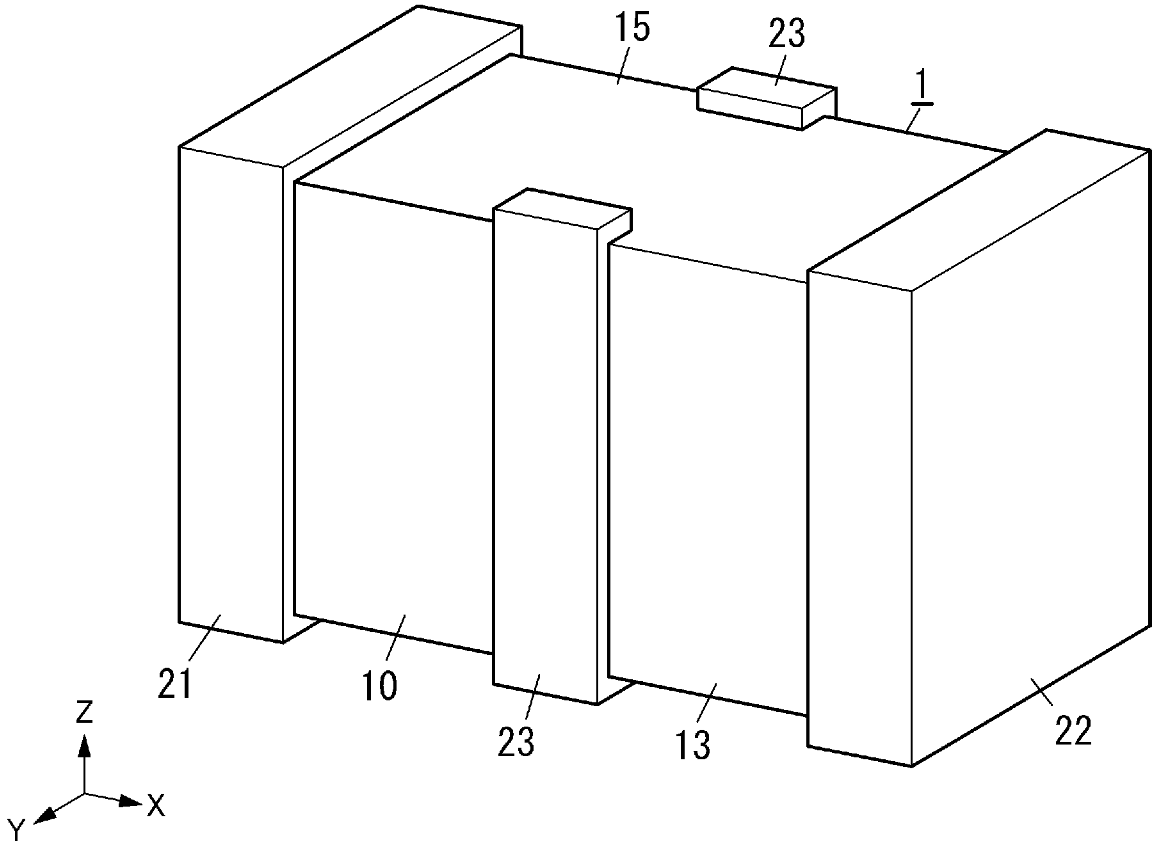
FIG. 1 is an external perspective view of a laminated varistor according to a first exemplary embodiment of the present disclosure.
Figure 2:
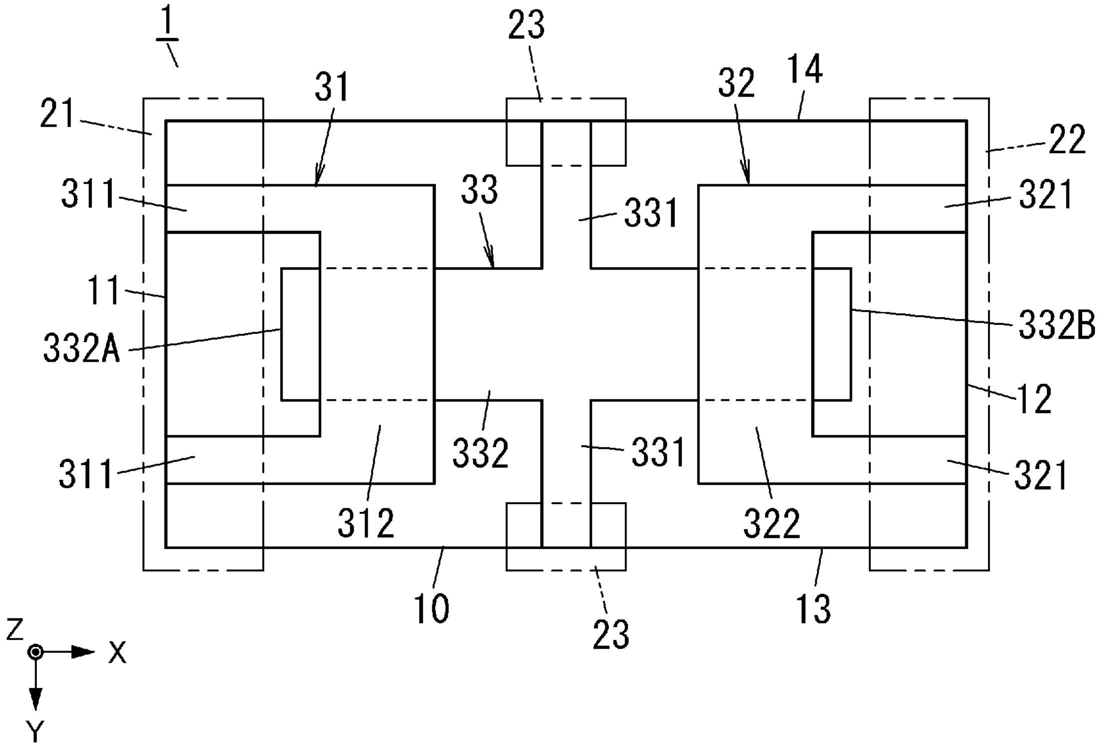
FIG. 2 is a transparent view of the laminated varistor as viewed from above.
Figure 3:
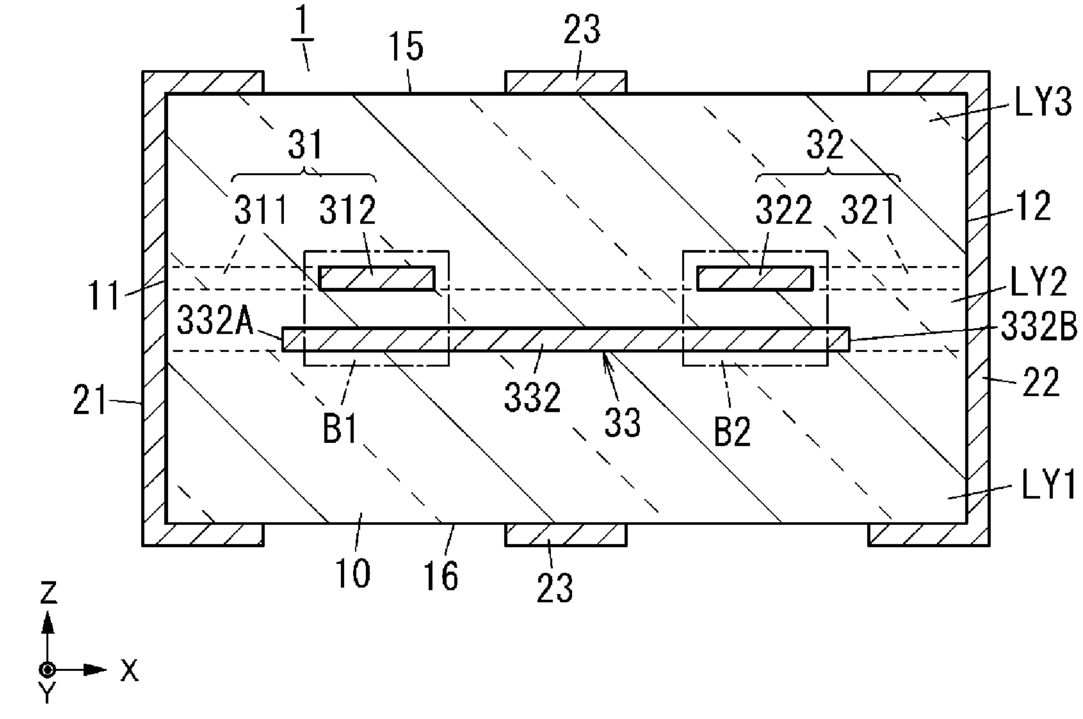
FIG. 3 is a cross-sectional view of the laminated varistor.

FIG. 1 is an external perspective view of laminated varistor 1 of the first exemplary embodiment, FIG. 2 is a transparent view of laminated varistor 1 from above, and FIG. 3 is a cross-sectional view of laminated varistor 1.

Laminated varistor 1 includes sintered body 10, first external electrode 21, second external electrode 22, third external electrode 23, first internal electrode 31, second internal electrode 32, and third internal electrode 33. Sintered body 10 of laminated varistor 1 excluding the external electrodes (first to third external electrodes 21 to 23) has, for example, a rectangular parallelepiped shape with a length of 1.6 mm, a width of 0.8 mm, and a height of 0.8 mm. Note that, in the external perspective view of FIG. 1 and the like, although an outer shape of sintered body 10 is illustrated in a rectangular parallelepiped shape, corners of sintered body 10 may be appropriately chamfered, and the corners of sintered body 10 may be rounded.

In the following description, as illustrated in FIGS. 1 to 3, an X-axis direction parallel to a long side direction of sintered body 10 is defined as a left-right direction, a Y-axis direction is defined as a front-back direction (depth direction), and a Z-axis direction is defined as an up-down direction. Further, a positive orientation in the X-axis direction is defined as a right side, a positive direction in the Y-axis direction is defined as a front side, and a positive direction in the Z-axis direction is defined as an upper side. However, these directions are examples, and are not intended to limit a direction of laminated varistor 1 at the time of use. In addition, arrows that point the directions are illustrated only for explanation in the drawings. The arrows are unsubstantial.

As illustrated in FIGS. 1 to 3, sintered body 10 has first end surface 11 and second end surface 12, first side surface 13 and second side surface 14, and first principal surface 15 and second principal surface 16. First end surface 11 and second end surface 12 face each other in a first direction (direction parallel to an X-axis). First side surface 13 and second side surface 14 face each other in a second direction (direction parallel to a Y-axis) intersecting the first direction. First principal surface 15 and second principal surface 16 face each other in a third direction (direction parallel to a Z-axis) intersecting the first direction and the second direction. Sintered body 10 has a laminated structure in which a plurality of (for example, three) layers LY1 to LY3 are laminated along the third direction.

First internal electrode 31, second internal electrode 32, and third internal electrode 33 are provided inside sintered body 10.

First external electrode 21 is provided on first end surface 11 and is connected to first internal electrode 31. Second external electrode 22 is provided on second end surface 12 and is connected to second internal electrode 32. Third external electrode 23 is provided on at least one of first side surface 13 and second side surface 14, and is connected to third internal electrode 33.

First internal electrode 31 includes a pair of first connecting parts 311 and first facing part 312. The pair of first connecting parts 311 extends from first end surface 11 along the first direction and is connected to first external electrode 21. The pair of first connecting parts 311 extends from first end surface 11 toward second end surface 12. First facing part 312 is disposed along the second direction and is provided between the pair of first connecting parts 311.

Second internal electrode 32 includes a pair of second connecting parts 321 and second facing part 322. The pair of second connecting parts 321 extends from second end surface 12 along the first direction and is connected to second external electrode 22. The pair of second connecting parts 321 extends from second end surface 12 toward first end surface 11. Second facing part 322 is disposed along the second direction and is provided between the pair of second connecting parts 321.

Third internal electrode 33 includes third facing part 332 disposed along the first direction and third connecting part 331. Third connecting part 331 connects third external electrode 23 provided on at least one of first side surface 13 and second side surface 14 and third facing part 332.

Third facing part 332 overlaps a part of first facing part 312 and a part of second facing part 322 in the third direction.

First end 332A of third facing part 332 in the first direction is disposed between the pair of first connecting parts 311, and second end 332B of third facing part 332 in the first direction is disposed between the pair of second connecting parts 321.

Here, a case where two members are "connected" means that two members are electrically connected, that two members are not limited to being directly connected, and that two members may be indirectly connected via another member. Note that, in the present exemplary embodiment, third external electrode 23 is provided on both first side surface 13 and second side surface 14, and is connected to third internal electrode 33. In addition, third internal electrode 33 includes a pair of third connecting parts 331 that connects a pair of third external electrodes 23 provided on both first side surface 13 and second side surface 14 and third facing part 332. In addition, the second direction is, for example, a direction orthogonal to the first direction, and the third direction is, for example, a direction orthogonal to each of the first direction and the second direction. Note that, a case where two directions are "orthogonal" is not limited to a case where two directions intersect at an angle of 90 degrees, and an intersection angle of two directions may be deviated by about several degrees from 90 degrees.

In laminated varistor 1 of the present exemplary embodiment, in the third direction, first facing part 312 of first internal electrode 31 and third facing part 332 of third internal electrode 33 face each other, and second facing part 322 of second internal electrode 32 and third facing part 332 of third internal electrode 33 face each other. As a result, first varistor B1 is formed between first facing part 312 of first internal electrode 31 and third facing part 332 of third internal electrode 33. In addition, second varistor B2 is formed between second facing part 322 of second internal electrode 32 and third facing part 332 of third internal electrode 33.

Here, first end 332A of third facing part 332 is positioned between the pair of first connecting parts 311, and third facing part 332 overlaps an intermediate portion of first facing part 312 in the second direction as viewed from the third direction. Accordingly, even though a position of third facing part 332 with respect to first facing part 312 changes in one or both of the first direction and the second direction due to a dimensional error or the like at the time of manufacture, it is possible to reduce a possibility that an area of an overlapping portion between first facing part 312 and third facing part 332 changes. Therefore, it is possible to reduce a possibility that an electrostatic capacitance of first varistor B1 changes due to a dimensional error or the like at the time of manufacturer.

In addition, second end 332B of third facing part 332 is positioned between the pair of second connecting parts 321, and third facing part 332 overlaps an intermediate portion of second facing part 322 in the second direction as viewed from the third direction. Accordingly, even though a position of third facing part 332 with respect to second facing part 322 changes in one or both of the first direction and the second direction due to a dimensional error or the like at the time of manufacture, it is possible to reduce a possibility that an area of an overlapping portion between second facing part 322 and third facing part 332 changes. Therefore, it is possible to reduce a possibility that an electrostatic capacitance of second varistor B2 changes due to a dimensional error or the like at the time of manufacturer. As a result, according to laminated varistor 1 of the present exemplary embodiment, it is possible to reduce variations in electrostatic capacitance of two varistors (first varistor B1 and second varistor B2) caused by a dimensional error or the like at the time of manufacturer.

(1.2) Details

Laminated varistor 1 of the first exemplary embodiment will be described in detail with reference to FIGS. 1 to 3.

As described above, laminated varistor 1 includes sintered body 10 having a laminated structure in which a plurality of layers are laminated. Sintered body 10 contains a semiconductor ceramic component having non-linear resistance characteristics. Sintered body 10 may contain, for example, ZnO as a main component, and may contain at least one of $Bi_2O_3$, $Pr_6O_{11}$, $Co_2O_3$, $MnO_2$, $Sb_2O_3$, $CaCO_3$, and $Cr_2O_3$ as sub-components. Sintered body 10 has a form in which ZnO is sintered and other sub-components are precipitated at grain boundaries thereof, and internal electrodes (first to third internal electrodes 31 to 33) are formed between the laminated layers. Then, the nonlinear resistance characteristics are exhibited by a grain boundary barrier formed between ZnO grains. Sintered body 10 of the present exemplary embodiment is formed by, for example, laminating and then sintering three layers LY1 to LY3 (see FIG. 3) containing ZnO as the main component.

First to third internal electrodes 31 to 33 are provided inside sintered body 10. First to third internal electrodes 31 to 33 contain, for example, Ag, Pd, PdAg. PtAg, or the like. Sintered body 10 has, for example, the laminated structure (see FIG. 3) in which three layers LY1 to LY3 are laminated in the third direction, third internal electrode 33 is formed on an upper surface of layer LY1, and first and second internal electrodes 31, 32 are formed on an upper surface of layer LY2. That is, sintered body 10 is formed by laminating and firing a ceramic sheet to be layer LY1 to which an electrode material for forming third internal electrode 33 is applied, a ceramic sheet to be layer LY2 to which an electrode material for forming first internal electrode 31 and second internal electrode 32 is applied, and a ceramic sheet to be layer LY3. As a result, inside sintered body 10, third internal electrode 33 is provided between layer LY1 and layer LY2, and first internal electrode 31 and second internal electrode 32 are provided between layer LY2 and layer LY3.

First internal electrode 31 includes the pair of first connecting parts 311 and first facing part 312. Each of the pair of first connecting parts 311 is formed in a rectangular plate shape extending from first end surface 11 toward second end surface 12. An end surface on a left side of each of the pair of first connecting parts 311 is exposed to first end surface 11 of sintered body 10. First facing part 312 is formed in a rectangular plate shape extending along the second direction, and connects ends on a right side of the pair of first connecting parts 311. Here, first internal electrode 31 is formed in a U shape as viewed from the third direction by the pair of first connecting parts 311 and first facing part 312.

Second internal electrode 32 includes the pair of second connecting parts 321 and second facing part 322. Each of the pair of second connecting parts 321 is formed in a rectangular plate shape extending from second end surface 12 toward first end surface 11. An end surface on a right side of each of the pair of second connecting parts 321 is exposed to second end surface 12 of sintered body 10. Second facing part 322 is formed in a rectangular plate shape extending along the second direction, and connects ends on a left side of the pair of second connecting parts 321. Here, second internal electrode 32 is formed in a U shape as viewed from the third direction by the pair of second connecting parts 321 and second facing part 322.

Third internal electrode 33 includes the pair of third connecting parts 331 and third facing part 332.

Third facing part 332 is formed in a rectangular plate shape extending along the first direction. An end on a left side (that is, first end 332A) of third facing part 332 extends to a left side of first facing part 312 as viewed from the third direction, and an end on a right side (that is, second end 332B) of third facing part 332 extends to a right side of second facing part 322 as viewed from the third direction. As a result, third facing part 332 is disposed to face first facing part 312 of first internal electrode 31 and second facing part 322 of second internal electrode 32 in the third direction. Then, first end 332A of third facing part 332 is disposed between the pair of first connecting parts 311 as viewed from the third direction, and second end 332B of third facing part 332 is disposed between the pair of second connecting parts 321 as viewed from the third direction.

The pair of third connecting parts 331 is formed in a rectangular plate shape extending along the second direction. One of the pair of third connecting parts 331 protrudes from first side surface 13 toward second side surface 14, and the other of the pair of third connecting parts 331 protrudes from second side surface 14 toward first side surface 13. In one of the pair of third connecting parts 331, a first end in the second direction is exposed to first side surface 13, and a second end in the second direction is connected to a central portion in a longitudinal direction of third facing part 332. In the other of the pair of third connecting parts 331, a first end in the second direction is exposed to second side surface 14, and a second end in the second direction is connected to a central portion in a longitudinal direction of third facing part 332.

Here, second internal electrode 32 is disposed at a position different from an overlapping range overlapping first internal electrode 31 in the third direction. Accordingly, in third facing part 332 of third internal electrode 33, a facing portion facing first facing part 312 of first internal electrode 31 and a facing portion facing second facing part 322 of second internal electrode 32 are different from each other. As a result, it is possible to reduce crosstalk between first varistor B1 formed between first facing part 312 and third facing part 332 and second varistor B2 formed between second facing part 322 and third facing part 332. In addition, it is also possible to reduce a difference in electrostatic capacitance between first varistor B1 and second varistor B2 caused by a dimensional error or the like of first to third internal electrodes 31 to 33 and first to third external electrodes 21 to 23.

First external electrode 21 is provided on first end surface 11 of sintered body 10. First external electrode 21 is provided over entire first end surface 11, and is provided from first end surface 11 to a part (left end) of first side surface 13 and second side surface 14 and a part (left end) of first principal surface 15 and second principal surface 16. First external electrode 21 is connected to end surfaces of the pair of first connecting parts 311 exposed to first end surface 11, and first external electrode 21 is electrically connected to first internal electrode 31.

Second external electrode 22 is provided on second end surface 12 of sintered body 10. Second external electrode 22 is provided on entire second end surface 12, and is provided from second end surface 12 to a part (right end) of first side surface 13 and second side surface 14 and a part (right end) of first principal surface 15 and second principal surface 16. Second external electrode 22 is connected to end surfaces of the pair of second connecting parts 321 exposed to second end surface 12, and second external electrode 22 is electrically connected to second internal electrode 32.

On first side surface 13 and second side surface 14 of sintered body 10, a pair of third external electrodes 23 is provided at a central portion in the first direction. One of the pair of third external electrodes 23 is provided from an upper end to a lower end of a central portion of first side surface 13 in the longitudinal direction, and an upper end and a lower end of third external electrode 23 are provided over a part (front end) of first principal surface 15 and second principal surface 16. In addition, the other of the pair of third external electrodes 23 is provided from an upper end to a lower end of the central portion of second side surface 14 in the longitudinal direction, and an upper end and a lower end of third external electrode 23 are provided over a part (rear end) of first principal surface 15 and second principal surface 16. Third external electrode 23 provided on first side surface 13 is connected to an end surface of third connecting part 331 exposed on first side surface 13, and third external electrode 23 provided on first side surface 13 is electrically connected to third internal electrode 33. Third external electrode 23 provided on second side surface 14 is connected to an end surface of third connecting part 331 exposed on second side surface 14, and third external electrode 23 provided on second side surface 14 is electrically connected to third internal electrode 33. As described above, the pair of third external electrodes 23 is electrically connected to third internal electrode 33.

First to third external electrodes 21 to 23 preferably include, for example, a primary electrode formed on a front surface of sintered body 10 and a plating electrode formed on the primary electrode. First to third external electrodes 21 to 23 may further include a secondary electrode formed on the primary electrode to cover the primary electrode. The primary electrode is formed to cover a part of the front surface of sintered body 10. The primary electrode preferably contains a metal as a main component, and more preferably contains silver as the main component. The primary electrode contains, for example, a metal such as Ag, AgPd, or AgPt as the main component, and preferably contains a glass component such as $Bi_2O_3$, $SiO_2$, or $B_2O_5$. Note that, the primary electrode is formed, for example, by applying a paste-shaped metal material for forming the primary electrode to a part of the front surface of sintered body 10. In addition, the plating electrode is provided to cover at least a part of the primary electrode. The plating electrode preferably includes, for example, a Ni electrode provided to cover the primary electrode or at least a part of the secondary electrode provided on the primary electrode, and a Sn electrode provided to cover at least a part of the Ni electrode.

Laminated varistor 1 of the present exemplary embodiment includes first varistor B1 formed between first external electrode 21 and third external electrode 23, and second varistor B2 formed between second external electrode 22 and third external electrode 23. An electrostatic capacitance of each of first varistor B1 and second varistor B2 is preferably less than or equal to 200 pF, and a difference (absolute value) between the electrostatic capacitance of first varistor B1 and the electrostatic capacitance of second varistor B2 is preferably less than or equal to 20% of the electrostatic capacitance of first varistor B1. As a result, in a case where laminated varistor 1 is connected to a communication IC that performs high frequency communication, it is possible to suppress crosstalk and improve communication quality.

(1.3) Method for Manufacturing Laminated Varistor

Hereinafter, an example of a method for manufacturing laminated varistor 1 of the present exemplary embodiment will be described. Note that, the method for manufacturing laminated varistor 1 is not limited to the following manufacturing method, and can be appropriately changed.

The method for manufacturing laminated varistor 1 includes, for example, a first step, a second step, and a third step. Hereinafter, the steps will be described in detail.

[First Step]

In the first step, sintered body 10 containing ZnO as a main component and having first to third internal electrodes 31 to 33 disposed therein is prepared.

A plurality of ceramic sheets are prepared by using a slurry containing ZnO. An internal electrode paste to be third internal electrode 33 is applied to a front surface of the ceramic sheet to be layer LY1 among the plurality of ceramic sheets. In addition, an internal electrode paste to be first internal electrode 31 and an internal electrode paste to be second internal electrode 32 are applied to a front surface of the ceramic sheet to be layer LY2 among the plurality of ceramic sheets. Then, after laminating, pressing, and cutting the plurality of ceramic sheets, sintered body 10 is prepared by performing debinding and firing.

Note that, the slurry for forming the ceramic sheet can be prepared, for example, by mixing ZnO as a main raw material, at least one of $Bi_2O_3$, $Co_2O_3$, $MnO_2$, $Sb_2O_3$, $Pr_6O_{11}$, $Co_2O_3$, $CaCO_3$, and $Cr_2O_3$ as a sub-raw material, and a binder.

For example, an Ag paste, a Pd paste, a Pt paste, a PdAg paste, a PtAg paste, or the like can be used as the internal electrode paste.

A temperature at which debinding is performed is, for example, between 300° C. and 500° C. inclusive. A temperature at which firing is performed can be appropriately adjusted depending on a configuration, a composition, and the like of sintered body 10 to be obtained, and is, for example, between 800° C. and 1300° ° C. inclusive.

The first step includes, for example, a coating step, an internal electrode applying step, a laminating step, a cutting step, and a firing step. In the coating step, the ceramic sheet containing ZnO as a main component is produced. In the internal electrode applying step, the internal electrode paste is applied to the front surface of the ceramic sheet. Examples of the applying method in the internal electrode applying step include a printing method. In the laminating step, a laminate is obtained by laminating the ceramic sheet to which the internal electrode paste is applied and the ceramic sheet to which the internal electrode paste is not applied. In the cutting step, the laminate is cut to obtain a laminated body having a lamination surface (first principal surface 15 and second principal surface 16) and a cut surface (first end surface 11, second end surface 12, first side surface 13, and second side surface 14). In the firing step, the laminated body is fired to obtain sintered body 10.

By such a method, it is possible to produce sintered body 10 having first principal surface 15 and second principal surface 16 facing each other, first side surface 13 and second side surface 14 facing each other, and first end surface 11 and second end surface 12 facing each other.

Note that, in the first step, a high-resistance layer having a resistance higher than a resistance of sintered body 10 may be formed to cover at least a part of sintered body 10. Examples of the method for forming the high-resistance layer include (i) a method for applying a solution containing a precursor of the high-resistance layer to sintered body 10, (ii) a method for reacting $SiO_2$ with sintered body 10 containing ZnO as the main component, and (iii) a method for thermally diffusing an alkali metal into sintered body 10.

[Second Step]

In the second step, a primary electrode paste to be first to third external electrodes 21 to 23 is applied to cover a part of the high-resistance layer and to come into contact with first to third internal electrodes 31 to 33.

The primary electrode paste can be prepared by mixing a metal component containing, for example, Ag powder, AgPd powder, AgPt powder, or the like, a glass component containing $Bi_2O_3$, $SiO_2$, $B_2O_5$, or the like, and a solvent. In addition, a paste containing Ag as a main component and containing a resin component or the like can also be used as the primary electrode paste. The primary electrode paste is baked at a temperature between 700° C. and 800° C. inclusive after applying the primary electrode paste, and thus, it is possible to promote alloying of the primary electrode paste to be first external electrode 21 with first internal electrode 31, alloying of the primary electrode paste to be second external electrode 22 with second internal electrode 32, and alloying of the primary electrode paste to be third external electrode 23 with third internal electrode 33. Accordingly, it is possible to form a primary electrode with improved adhesion.

[Third Step]

In the third step, the plating electrode is formed to cover at least a part of the primary electrode formed from the primary electrode paste. As a result, external electrodes (first to third external electrodes 21 to 23) having the primary electrode and the plating electrode formed on the primary electrode can be formed. Note that, examples of the method for forming the plating electrode include a method for sequentially performing Ni plating and Sn plating by an electrolytic plating method.

(1.4) Modifications

The above exemplary embodiment is merely one of various exemplary embodiments of the present disclosure. The above exemplary embodiment can be variously changed in accordance with design and the like as long as the object of the present disclosure can be achieved.

Hereinafter, modifications of the first exemplary embodiment will be listed. The modifications to be described below can be applied in appropriate combination. In addition, in the modifications to be described below, the same reference numerals are given to the components common to the above first exemplary embodiment, and the description thereof will be omitted.

(1.4.1) First Modification

Laminated varistor 1 according to a first modification of the first exemplary embodiment will be described with reference to FIG. 4. Laminated varistor 1 according to the first modification is different from laminated varistor 1 of the first exemplary embodiment in that shapes of corner portions 314, 324 of first internal electrode 31 and second internal electrode 32 facing third external electrode 23 as viewed from the third direction are chamfered shapes in which corners of corner portions 314, 324 are chamfered. Note that, since laminated varistor 1 according to the first modification is similar to laminated varistor 1 according to the above-described first exemplary embodiment except for the shapes of corner portions 314, 324, the same reference numerals are given to the components common to the first exemplary embodiment, and the description thereof will be omitted.

In first internal electrode 31, corner portion 314 facing third external electrode 23 includes a first corner portion formed by first connecting part 311 of the pair of first connecting parts 311 close to first side surface 13 and first facing part 312, and a second corner portion formed by first connecting part 311 of the pair of first connecting parts 311 close to second side surface 14 and first facing part 312. The first corner portion is a corner portion formed by a side of first connecting part 311 close to first side surface 13 on first side surface 13 side and a side of first facing part 312 close to third external electrode 23. The second corner portion is a corner portion formed by a side of first connecting part 311 close to second side surface 14 on second side surface 14 side and a side of first facing part 312 close to third external electrode 23.

In addition, in second internal electrode 32, corner portion 324 facing third external electrode 23 includes a third corner portion formed by second connecting part 321 of the pair of second connecting parts 321 and second facing part 322 close to first side surface 13, and a fourth corner portion formed by second connecting part 321 of the pair of second connecting parts 321 and second facing part 322 close to second side surface 14. The third corner portion is a corner portion formed by a side of second connecting part 321 close to first side surface 13 on first side surface 13 side and a side of second facing part 322 close to third external electrode 23. The fourth corner portion is a corner portion formed by a side of second connecting part 321 close to second side surface 14 on second side surface 14 side and a side of second facing part 322 close to third external electrode 23.

In addition, a case where the shapes of the first corner portion and the second corner portion which are corner portions 314 are the "chamfered shapes" means that the first corner portion and the second corner portion have a C-chamfered shape in which each of the first corner portion and the second corner portion is cut off on a plane obliquely intersecting two sides forming each of the first corner portion and the second corner portion or an R-chamfered shape in which corners formed by two sides are rounded. Similarly, a case where the shapes of the third corner portion and the fourth corner portion which are corner portions 324 are the "chamfered shapes" means that the third corner portion and the fourth corner portion have a C-chamfered shape in which each of the third corner portion and the fourth corner portion is cut off on a plane obliquely intersecting two sides forming each of the third corner portion and the fourth corner portion or an R-chamfered shape in which corners formed by two sides are rounded.

Figure 4:
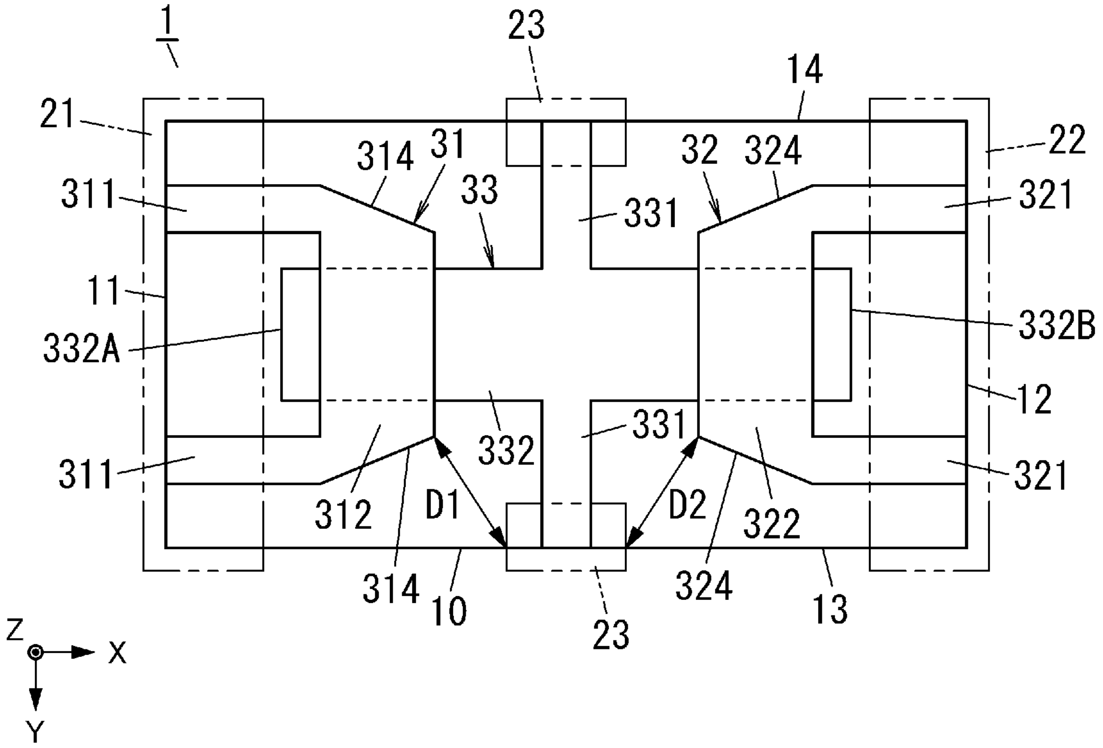
FIG. 4 is a transparent view of a laminated varistor according to a first modification of the first exemplary embodiment from above.

Laminated varistor 1 of the first modification illustrated in FIG. 4 is an example in which corner portion 314 of first internal electrode 31 and corner portion 324 of second internal electrode 32 have the C-chamfered shapes. As described above, corner portion 314 of first internal electrode 31 and corner portion 324 of second internal electrode 32 are formed into the chamfered shapes, and thus, distances D1, D2 between first internal electrode 31 and second internal electrode 32, and third external electrode 23 can be set to be longer than in a case where the corner portions do not have the chamfered shapes. Note that, distances D1, D2 are shortest distances between first internal electrode 31 and second internal electrode 32, and third external electrode 23.

In laminated varistor 1 of the first modification, corner portions 314, 324 of first internal electrode 31 and second internal electrode 32 are formed into the chamfered shapes, and thus, distances D1, D2 between first internal electrode 31 and second internal electrode 32, and third external electrode 23 can be lengthened. Accordingly, crosstalk generated between first internal electrode 31, second internal electrode 32, and third external electrode 23 can be reduced. In addition, it is also possible to reduce a difference in electrostatic capacitance between first varistor B1 and second varistor B2 caused by a dimensional error or the like of first to third internal electrodes 31 to 33 and first to third external electrodes 21 to 23. In addition, it is possible to reduce a stray capacitance generated between first internal electrode 31 and third external electrode 23 and a stray capacitance generated between second internal electrode 32 and third external electrode 23.

Figure 5:
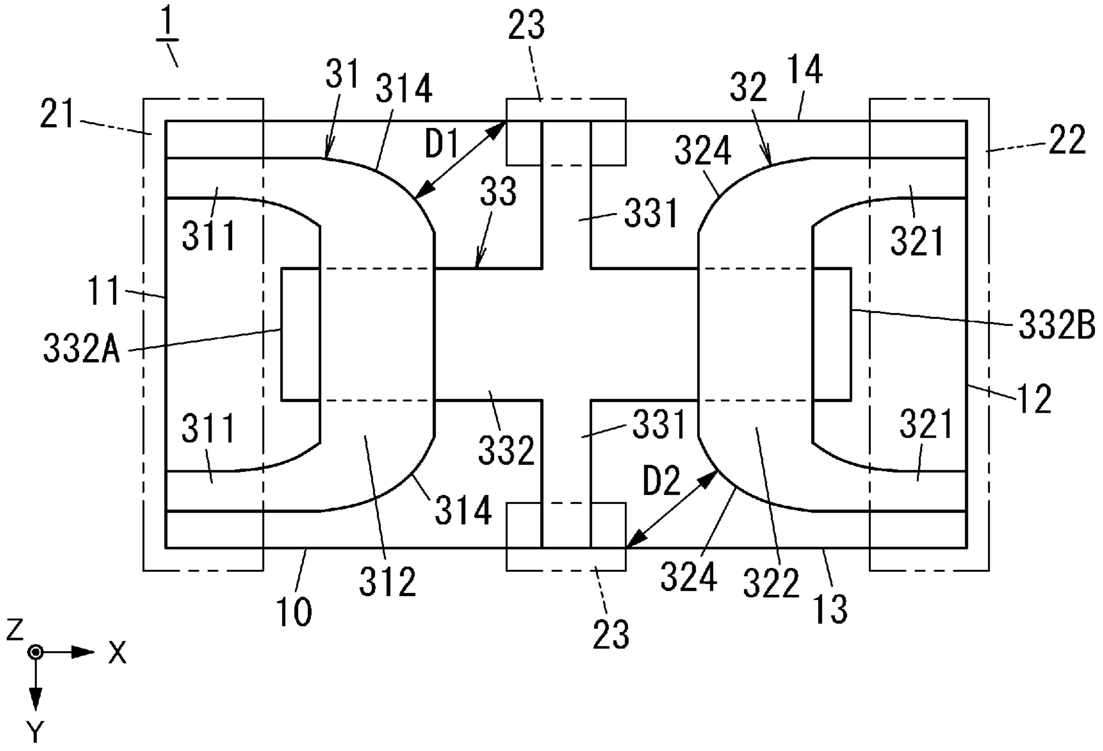
FIG. 5 is a transparent view of the laminated varistor according to the first modification of the first exemplary embodiment from above.

Note that, the chamfered shapes provided at corner portions 314, 324 of first internal electrode 31 and second internal electrode 32 are not limited to the C-chamfered shapes, and can be appropriately changed. For example, as illustrated in FIG. 5, the shape of each of corner portion 314 of first internal electrode 31 and corner portion 324 of second internal electrode 32 as viewed from the third direction may be the R-chamfered shape.

(1.4.2) Second Modification

Figure 6:
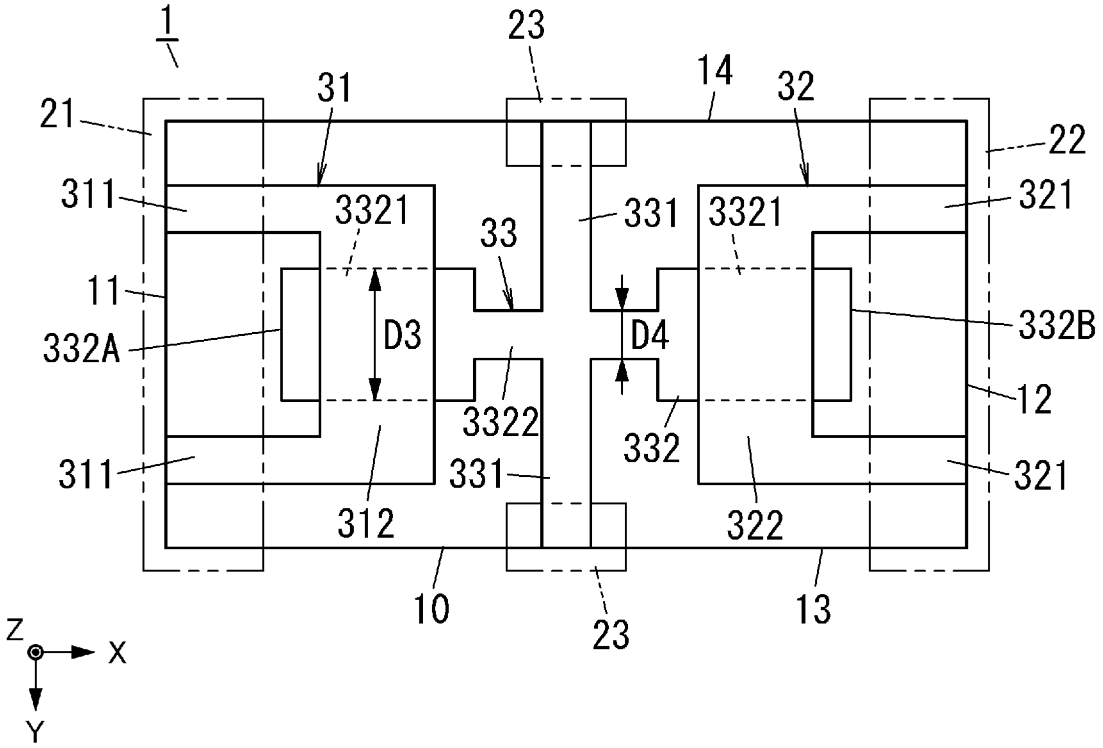
FIG. 6 is a transparent view of a laminated varistor according to a second modification of the first exemplary embodiment from above.

Laminated varistor 1 according to a second modification of the first exemplary embodiment will be described with reference to FIG. 6. In laminated varistor 1 according to the second modification, third facing part 332 includes a pair of overlapping portions 3321 overlapping first facing part 312 and second facing part 322 in the third direction, and intermediate portion 3322 between the pair of overlapping portions 3321. Then, dimension D4 of intermediate portion 3322 in the second direction is smaller than dimension D3 of the pair of overlapping portions 3321 in the second direction. That is, laminated varistor 1 according to the second modification is different from the first exemplary embodiment in that a width of intermediate portion 3322 is narrower in third facing part 332 than in the pair of overlapping portions 3321. Note that, since laminated varistor 1 according to the second modification is similar to the above-described first exemplary embodiment except for the shape of third facing part 332, the same reference numerals are given to the components common to the first exemplary embodiment, and the description thereof will be omitted.

As described above, the width (dimension in the second direction) of intermediate portion 3322 is set to be narrower than the pair of overlapping portions 3321, and thus, the crosstalk generated between first external electrode 21 and second external electrode 22 can be reduced. Accordingly, it is also possible to reduce a difference in electrostatic capacitance between first varistor B1 and second varistor B2 caused by a dimensional error or the like of first to third internal electrodes 31 to 33 and first to third external electrodes 21 to 23.

Note that, in the present modification, although intermediate portion 3322 is formed in the rectangular plate shape, the shape of intermediate portion 3322 is not limited to the illustrated shape. Intermediate portion 3322 may be formed in such a shape that dimension D4 in the second direction gradually decreases with increasing distance from overlapping portion 3321.

(1.4.3) Third Modification

Figure 7:
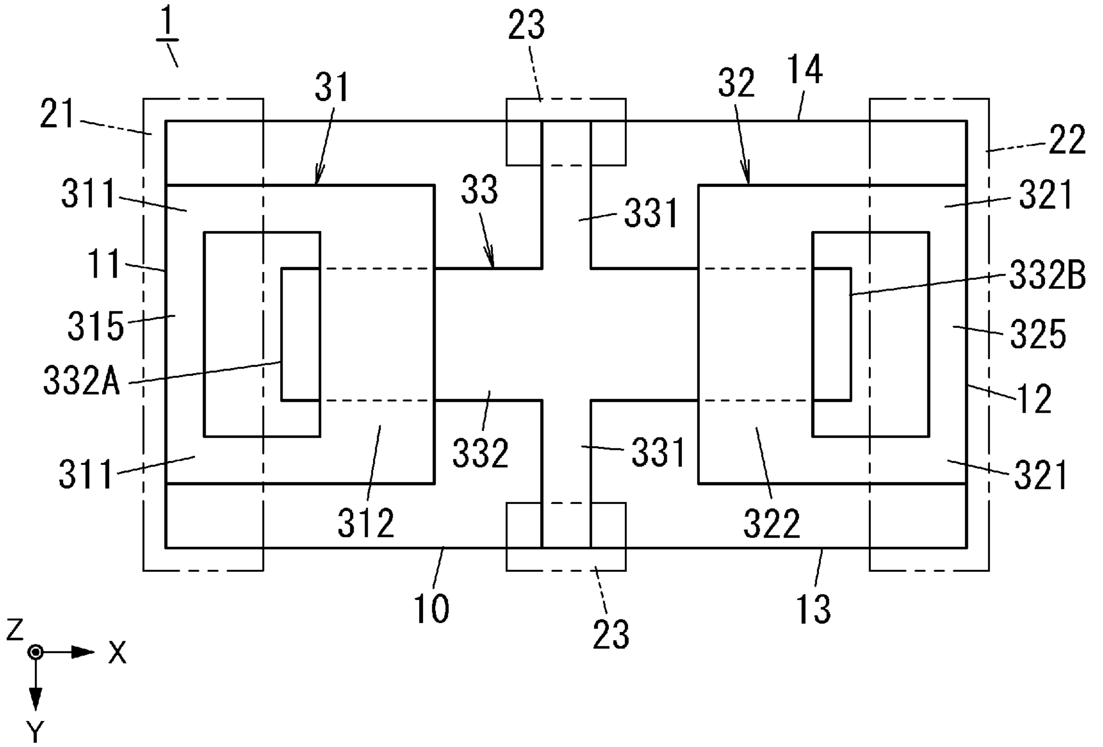
FIG. 7 is a transparent view of a laminated varistor according to a third modification of the first exemplary embodiment from above.

Laminated varistor 1 according to a third modification of the first exemplary embodiment will be described with reference to FIG. 7. In laminated varistor 1 according to the third modification, first internal electrode 31 further includes first electrode connecting part 315, and second internal electrode 32 further includes second electrode connecting part 325. First electrode connecting part 315 is provided along first end surface 11, couples the pair of first connecting parts 311, and is connected to first external electrode 21. Second electrode connecting part 325 is provided along second end surface 12, couples the pair of second connecting parts 321, and is connected to second external electrode 22. Note that, since laminated varistor 1 according to the third modification is similar to the above-described first exemplary embodiment except that first electrode connecting part 315 and second electrode connecting part 325 are provided, the same reference numerals are given to the components common to the first exemplary embodiment, and the description thereof will be omitted.

First electrode connecting part 315 is formed in a rectangular plate shape, and connects the pair of first connecting parts 311. An end surface of first electrode connecting part 315 is exposed to first end surface 11, and an end surface of first electrode connecting part 315 is connected to first external electrode 21.

Second electrode connecting part 325 is formed in a rectangular plate shape, and connects the pair of second connecting parts 321. An end surface of second electrode connecting part 325 is exposed to second end surface 12, and an end surface of second electrode connecting part 325 is connected to second external electrode 22.

Accordingly, first internal electrode 31 is connected to first external electrode 21 on the end surfaces of the pair of first connecting parts 311 and the end surface of first electrode connecting part 315, and a connection state between first internal electrode 31 and first external electrode 21 is stabilized and the reliability of the electrical connection is improved as compared with a case where first internal electrode 31 is connected to first external electrode 21 only on the end surfaces of the pair of first connecting parts 311.

In addition, second internal electrode 32 is connected to second external electrode 22 on the end surfaces of the pair of second connecting parts 321 and the end surface of the second electrode connecting part 325, and a connection state between second internal electrode 32 and second external electrode 22 is stabilized and the reliability of the electrical connection is improved as compared with a case where second internal electrode 32 is connected to second external electrode 22 on only the end surfaces of the pair of second connecting parts 321.

Note that, in the present modification, although first electrode connecting part 315 and second electrode connecting part 325 are formed in a rectangular plate shape, the shapes of first electrode connecting part 315 and second electrode connecting part 325 can be appropriately changed.

(1.4.4) Fourth Modification

Figure 8:
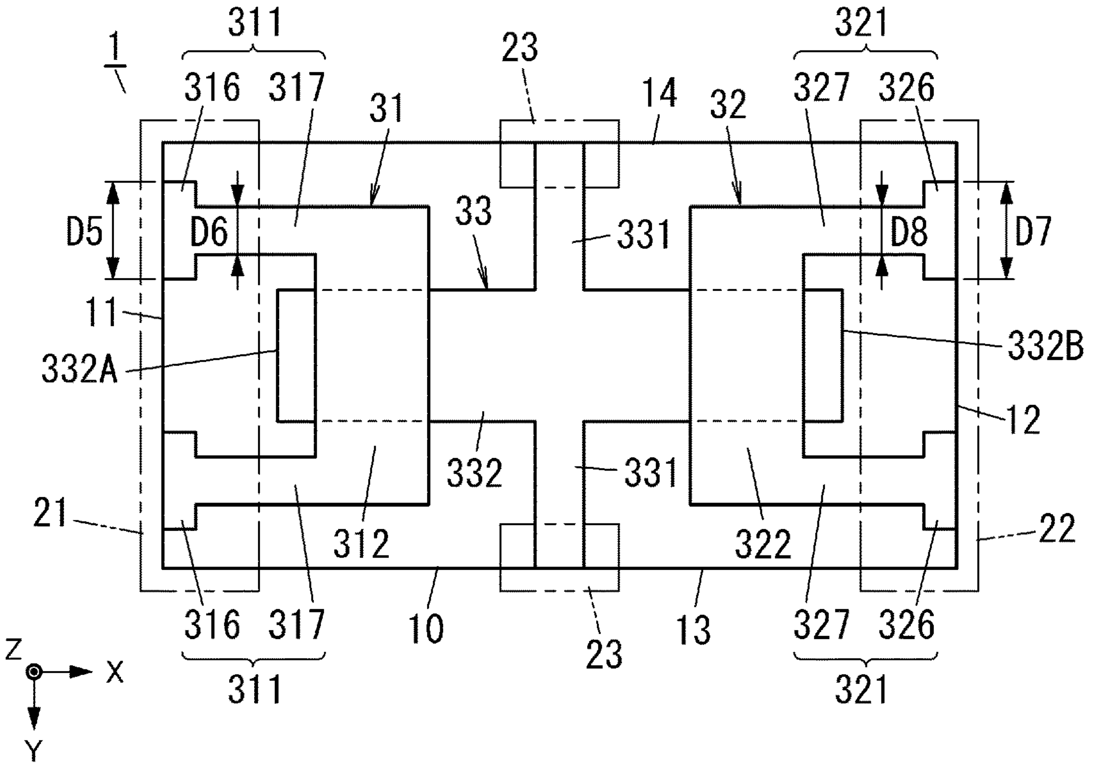
FIG. 8 is a transparent view of a laminated varistor according to a fourth modification of the first exemplary embodiment from above.

Laminated varistor 1 according to a fourth modification of the first exemplary embodiment will be described with reference to FIG. 8. In laminated varistor 1 according to the fourth modification, each of the pair of first connecting parts 311 includes first connection portion 316 connected to first external electrode 21 and first narrow part 317 having dimension D6 in the second direction smaller than first connection portion 316. In addition, each of the pair of second connecting parts 321 includes second connection portion 326 connected to second external electrode 22 and second narrow part 327 having dimension D8 in the second direction smaller than second connection portion 326. Note that, laminated varistor 1 according to the fourth modification is different from the first exemplary embodiment in the shapes of the pair of first connecting parts 311 and the pair of second connecting parts 321. Note that, since laminated varistor 1 according to the fourth modification has a configuration similar to the above-described first exemplary embodiment except for the shapes of the pair of first connecting parts 311 and the pair of second connecting parts 321, the same reference numerals are given to the components common to the first exemplary embodiment, and the description thereof will be omitted.

Each of the pair of first connecting parts 311 includes first connection portion 316 and first narrow part 317. An end surface of first connection portion 316 is exposed to first end surface 11, and an end surface of first connection portion 316 is connected to first external electrode 21. First narrow part 317 connects first connection portion 316 and first facing part 312. Here, dimension D6 of first narrow part 317 in the second direction is set to a dimension smaller than dimension D5 of first connection portion 316 in the second direction.

Each of the pair of second connecting parts 321 includes second connection portion 326 and second narrow part 327. An end surface of second connection portion 326 is exposed to second end surface 12, and an end surface of second connection portion 326 is connected to second external electrode 22. Second narrow part 327 connects second connection portion 326 and second facing part 322. Here, dimension D8 of second narrow part 327 in the second direction is set to a dimension smaller than dimension D7 of second connection portion 326 in the second direction.

In the present modification, in each of the pair of first connecting parts 311, since dimension D5 of first connection portion 316 connected to first external electrode 21 in the second direction is larger than dimension D6 of first narrow part 317 in the second direction, a connection state between first internal electrode 31 and first external electrode 21 is stabilized, and the reliability of the electrical connection is improved. In addition, in each of the pair of second connecting parts 321, since dimension D7 of second connection portion 326 connected to second external electrode 22 in the second direction is larger than dimension D8 of second narrow part 327 in the second direction, a connection state between second internal electrode 32 and second external electrode 22 is stabilized, and the reliability of the electrical connection is improved.

Note that, in the present modification, although first connection portion 316 and second connection portion 326 are formed in the rectangular plate shape, the shapes of first connection portion 316 and second connection portion 326 are not limited to the illustrated shapes. For example, first connection portion 316 may be formed in such a shape that dimension D5 in the second direction gradually increases toward first end surface 11. In addition, for example, second connection portion 326 may be formed in such a shape that dimension D7 in the second direction gradually increases toward second end surface 12.

(1.4.5) Fifth Modification

Figure 9:
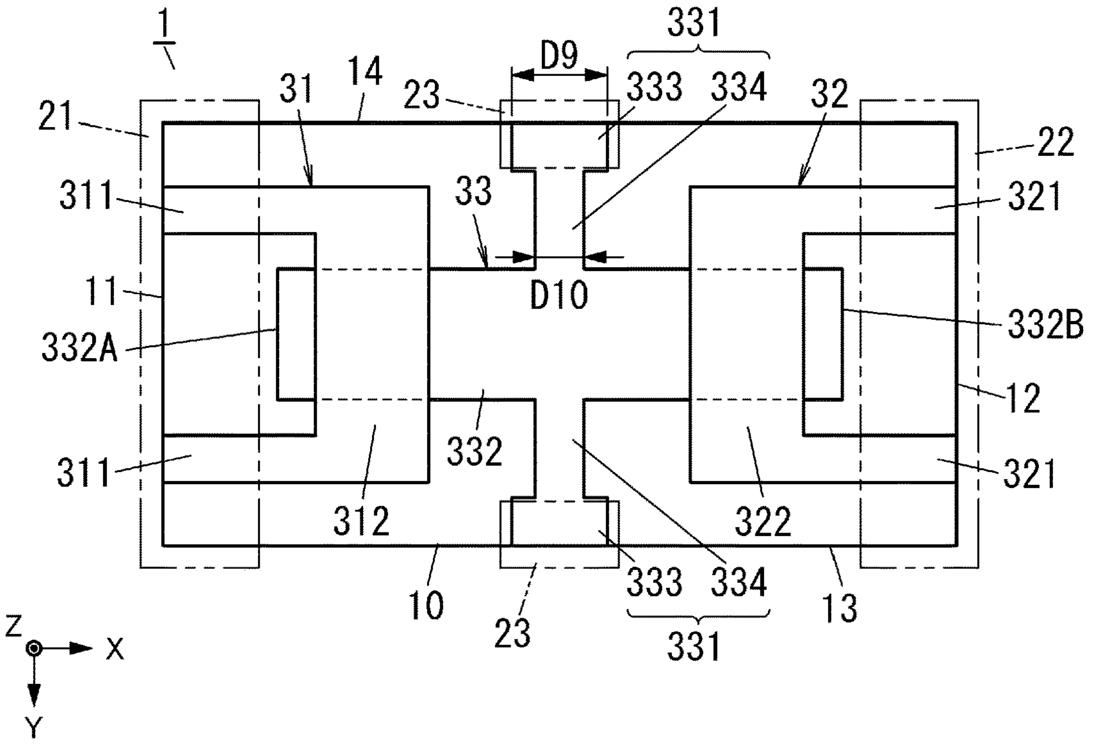
FIG. 9 is a transparent view of a laminated varistor according to a fifth modification of the first exemplary embodiment from above.

Laminated varistor 1 according to a fifth modification of the first exemplary embodiment will be described with reference to FIG. 9. In laminated varistor 1 according to the fifth modification, each of the pair of third connecting parts 331 includes third connection portion 333 connected to third external electrode 23 and third narrow part 334 having a dimension in the first direction smaller than third connection portion 333. Note that, since laminated varistor 1 according to the fifth modification has a configuration similar to the above-described first exemplary embodiment except for the shapes of the pair of third connecting parts 331, the same reference numerals are given to the components common to the first exemplary embodiment, and the description thereof will be omitted.

Each of the pair of third connecting parts 331 includes third connection portion 333 and third narrow part 334. An end surface of third connection portion 333 is exposed to first side surface 13 or second side surface 14, and an end surface of third connection portion 333 is connected to third external electrode 23. Third narrow part 334 is formed to have a dimension in the first direction smaller than third connection portion 333, and connects third connection portion 333 and third facing part 332.

In the present modification, in each of the pair of third connecting parts 331, since dimension D9 of third connection portion 333 connected to third external electrode 23 in the first direction is larger than dimension D10 of third narrow part 334 in the first direction, a connection state between third internal electrode 33 and third external electrode 23 is stabilized, and the reliability of the electrical connection is improved.

Note that, in the present modification, although third connection portion 333 is formed in a rectangular plate shape, the shape of third connection portion 333 is not limited to the illustrated shape. Third connection portion 333 may be formed in such a shape that dimension D9 in the first direction gradually increases toward first side surface 13 or second side surface 14.

(1.4.6) Sixth Modification

Figure 10:
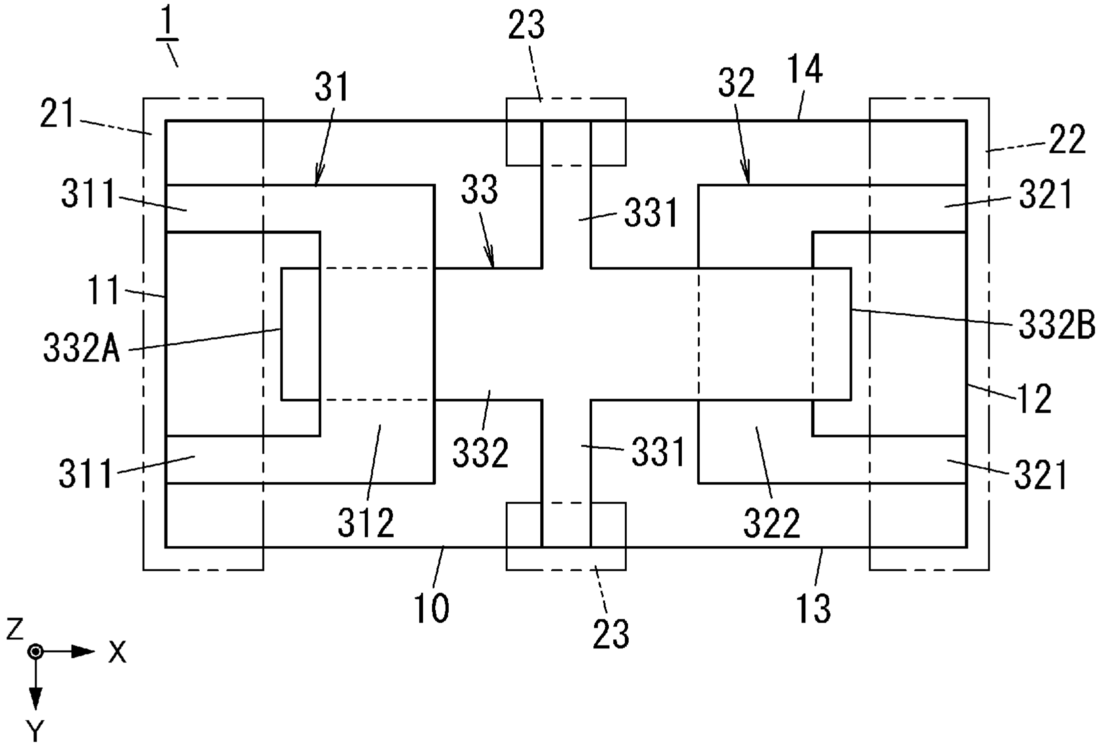
FIG. 10 is a transparent view of a laminated varistor according to a sixth modification of the first exemplary embodiment from above.
Figure 11:
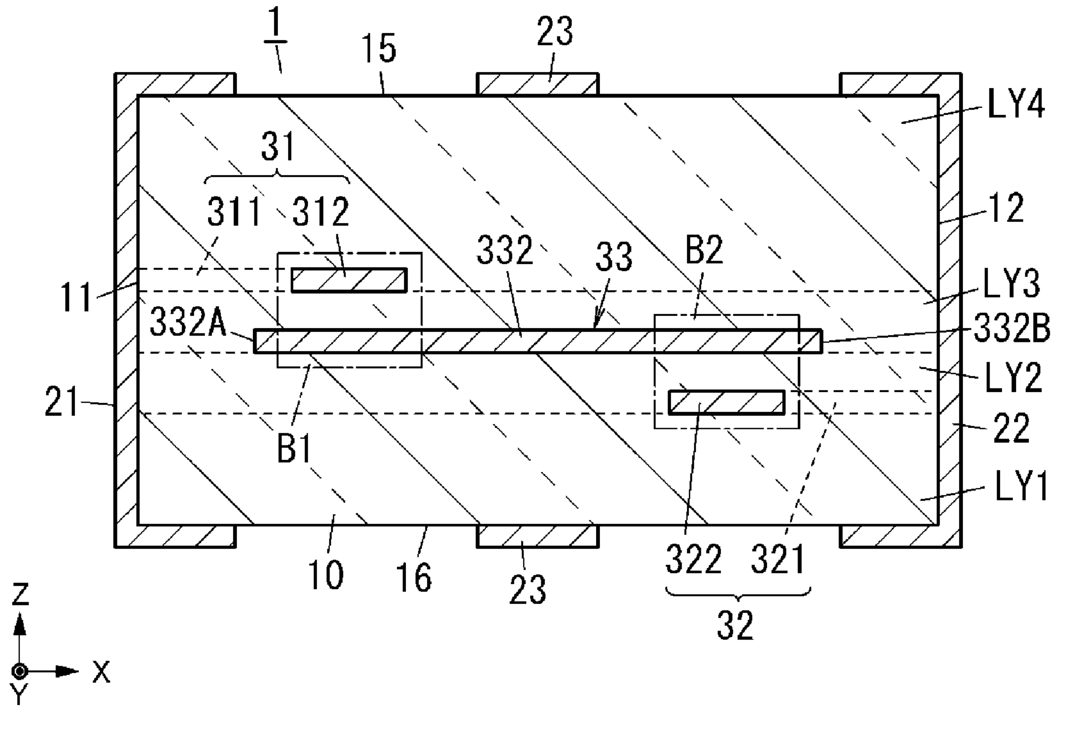
FIG. 11 is a cross-sectional view of the laminated varistor according to the sixth modification of the first exemplary embodiment.

Laminated varistor 1 according to a sixth modification of the first exemplary embodiment will be described with reference to FIGS. 10 and 11. In laminated varistor 1 according to the sixth modification, as illustrated in FIG. 11, layer LY3 in which first internal electrode 31 is formed and layer LY1 in which second internal electrode 32 is formed are different from each other. Note that, laminated varistor 1 according to the sixth modification is different from the first exemplary embodiment in the laminated structure of sintered body 10. Since laminated varistor 1 according to the sixth modification has a configuration similar to the above-described first exemplary embodiment except for the laminated structure of sintered body 10, the same reference numerals are given to the components common to the first exemplary embodiment, and the description thereof will be omitted.

In the present modification, sintered body 10 has a laminated structure in which four layers LY1 to LY4 are laminated along the third direction. Then, second internal electrode 32 is provided on the upper surface of layer LY1, third internal electrode 33 is provided on the upper surface of layer LY2, and first internal electrode 31 is provided on an upper surface of layer LY3.

As a result, first facing part 312 of first internal electrode 31 is disposed above third facing part 332, and second facing part 322 of second internal electrode 32 is disposed below third facing part 332. In addition, second internal electrode 32 is disposed at a position different from the overlapping range overlapping first internal electrode 31 in the third direction.

As described above, in the present modification, since layer LY3 in which first internal electrode 31 is formed, layer LY2 in which third internal electrode 33 is formed, and layer LY1 in which second internal electrode 32 is formed are different layers from each other, it is possible to reduce crosstalk generated between first external electrode 21 and second external electrode 22. Accordingly, it is possible to reduce a difference in electrostatic capacitance between first varistor B1 and second varistor B2 caused by a dimensional error or the like of first to third internal electrodes 31 to 33 and first to third external electrodes 21 to 23.

(1.4.7) Other Modifications

The shape of sintered body 10, the shapes and disposition of first to third external electrodes 21 to 23, and the shape and disposition of first to third internal electrodes 31 to 33 described in the above exemplary embodiment and the first to sixth modifications are examples, and can be appropriately changed.

In the above exemplary embodiment and the first to sixth modifications, although the pair of third external electrodes 23 is formed on both first side surface 13 and second side surface 14, third external electrode 23 may be formed on either one of first side surface 13 and second side surface 14. In this case, third internal electrode 33 may include one third connecting part 331 connecting third external electrode 23 formed on either one of first side surface 13 and second side surface 14 and third facing part 332.

(2) Second Exemplary Embodiment (2.1) Overview

Hereinafter, laminated varistor 1A according to a second exemplary embodiment of the present disclosure will be described with reference to the drawings.

Figure 12:
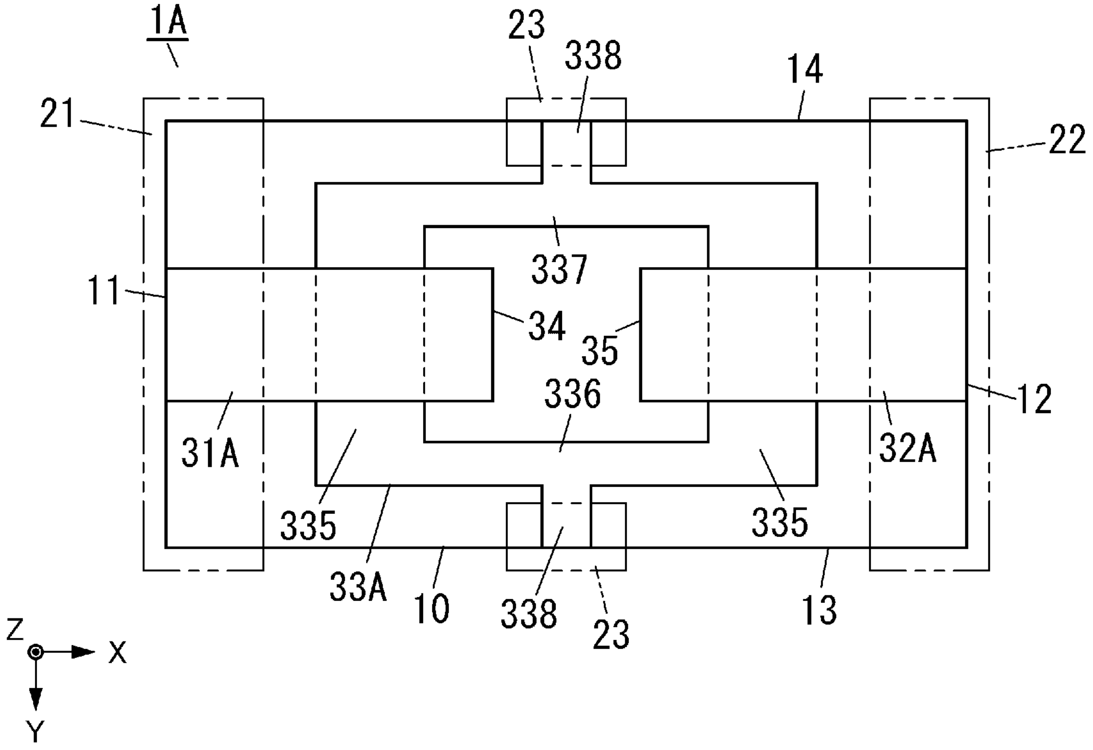
FIG. 12 is a transparent view of a laminated varistor according to a second exemplary embodiment of the present disclosure from above.
Figure 13:
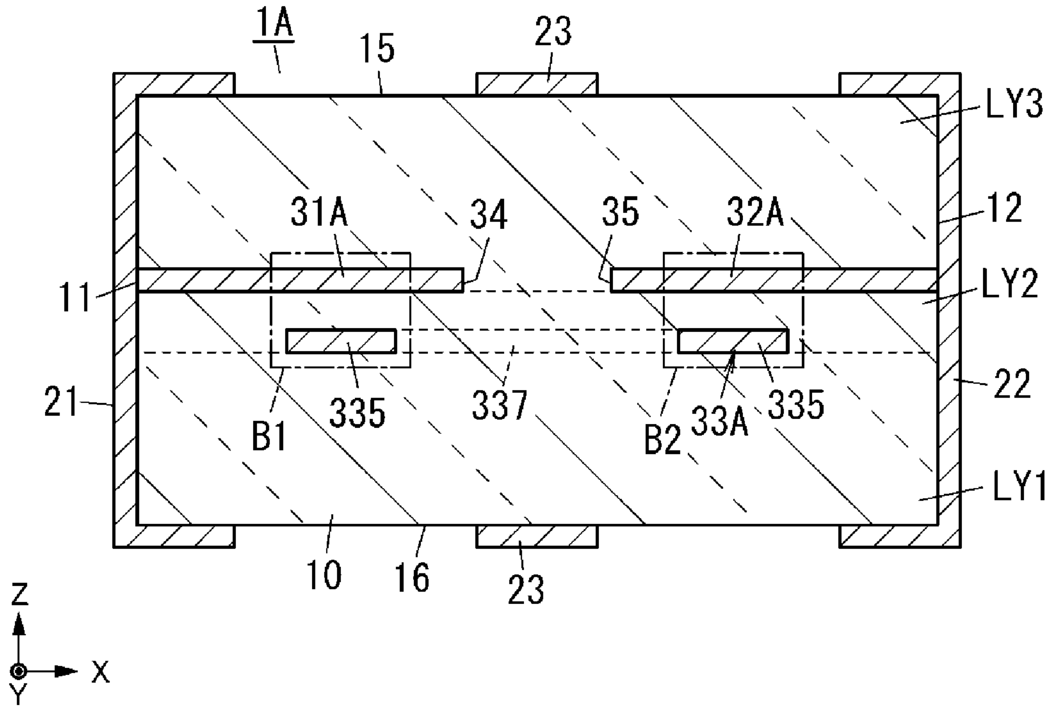
FIG. 13 is a cross-sectional view of the laminated varistor according to the second exemplary embodiment of the present disclosure.

FIG. 12 is a transparent view of laminated varistor 1A of the second exemplary embodiment from above, and FIG. 13 is a cross-sectional view of laminated varistor 1A of the second exemplary embodiment. Note that, an appearance of laminated varistor 1A of the second exemplary embodiment is similar to laminated varistor 1 of the first exemplary embodiment.

Laminated varistor 1A includes sintered body 10, first external electrode 21, second external electrode 22, third external electrode 23, first internal electrode 31A, second internal electrode 32A, and third internal electrode 33A. Sintered body 10 of laminated varistor 1A excluding the external electrodes (first to third external electrodes 21 to 23) has, for example, a rectangular parallelepiped shape with a length of 1.6 mm, a width of 0.8 mm, and a height of 0.8 mm.

In the following description, as illustrated in FIGS. 12 and 13, an X-axis direction parallel to a long side direction of sintered body 10 is defined as a left-right direction, a Y-axis direction is defined as a front-back direction (depth direction), and a Z-axis direction is defined as an up-down direction. Further, a positive orientation in the X-axis direction is defined as a right side, a positive direction in the Y-axis direction is defined as a front side, and a positive direction in the Z-axis direction is defined as an upper side. However, these directions are examples, and are not intended to limit a direction of laminated varistor 1A at the time of use. In addition, arrows that point the directions are illustrated only for explanation in the drawings. The arrows are unsubstantial.

As illustrated in FIGS. 12 and 13, sintered body 10 has first end surface 11 and second end surface 12, first side surface 13 and second side surface 14, and first principal surface 15 and second principal surface 16. First end surface 11 and second end surface 12 face each other in a first direction (direction parallel to an X-axis). First side surface 13 and second side surface 14 face each other in a second direction (direction parallel to a Y-axis) intersecting the first direction. First principal surface 15 and second principal surface 16 face each other in a third direction (direction parallel to a Z-axis) intersecting the first direction and the second direction. Sintered body 10 has a laminated structure in which a plurality of (for example, three) layers LY1 to LY3 are laminated along the third direction. Here, the second direction is, for example, a direction orthogonal to the first direction, and the third direction is, for example, a direction orthogonal to each of the first direction and the second direction. Note that, a case where two directions are "orthogonal" is not limited to a case where two directions intersect at an angle of 90 degrees, and an intersection angle of two directions may be deviated by about several degrees from 90 degrees.

First internal electrode 31A, second internal electrode 32A, and third internal electrode 33A are provided inside sintered body 10.

First external electrode 21 is provided on first end surface 11 and is connected to first internal electrode 31A. Second external electrode 22 is provided on second end surface 12 and is connected to second internal electrode 32A. Third external electrode 23 is provided on at least one of first side surface 13 and second side surface 14, and is connected to third internal electrode 33A. Note that, in laminated varistor 1A of the second exemplary embodiment illustrated in FIG. 12, the pair of third external electrodes 23 is provided on both first side surface 13 and second side surface 14, and is connected to third internal electrode 33A.

First internal electrode 31A extends from first end surface 11 along the first direction. More specifically, first internal electrode 31A extends from first end surface 11 toward second end surface 12 to near a center of sintered body 10.

Second internal electrode 32A extends from second end surface 12 along the first direction. More specifically, second internal electrode 32A extends from second end surface 12 toward first end surface 11 to near the center of sintered body 10. Note that, second internal electrode 32A and first internal electrode 31A are formed in same layer LY2, and a distal end of second internal electrode 32A is not in contact with first internal electrode 31A.

Third internal electrode 33A includes a pair of facing parts 335 extending along the second direction, first coupling part 336, second coupling part 337, and two connecting parts 338. First coupling part 336 couples first ends of the pair of facing parts 335 close to first side surface 13. Second coupling part 337 couples second ends of the pair of facing parts 335 close to second side surface 14. One of two connecting parts 338 connects first coupling part 336 and third external electrode 23 provided on first side surface 13, and the other of two connecting parts 338 connects second coupling part 337 and third external electrode 23 provided on second side surface 14. Note that, although third internal electrode 33A includes two connecting parts 338, only one of connecting parts 338 may be provided. That is, third internal electrode 33A may include connecting part 338 that connects at least one of first coupling part 336 and second coupling part 337 and third external electrode 23.

Here, in the third direction, at least a part of one of the pair of facing parts 335 overlaps first internal electrode 31A, and at least a part of the other of the pair of facing parts 335 overlaps second internal electrode 32A.

Inside sintered body 10, second internal electrode 32A is disposed at a position different from an overlapping range overlapping first internal electrode 31A in the third direction. End 34 of first internal electrode 31A and end 35 of second internal electrode 32A are disposed between first coupling part 336 and second coupling part 337.

In laminated varistor 1A of the present exemplary embodiment, one facing part 335 of the pair of facing parts 335 included in third internal electrode 33A faces first internal electrode 31A in the third direction, and other facing part 335 faces second internal electrode 32A in the third direction. As a result, first varistor B1 is formed between one of the pair of facing parts 335 and first internal electrode 31A, and second varistor B2 is formed between the other of the pair of facing parts 335 and second internal electrode 32A.

Here, each of first internal electrode 31A and second internal electrode 32A overlaps an intermediate portion of the pair of facing parts 335 in the second direction. In addition, end 34 of first internal electrode 31A and end 35 of second internal electrode 32A are disposed between first coupling part 336 and second coupling part 337. That is, first internal electrodes 31A are positioned on both sides of facing part 335 positioned on a left side in the first direction. In addition, second internal electrodes 32A are positioned on both sides of facing part 335 positioned on a right side in the first direction.

Accordingly, even though a position of facing part 335 on a left side with respect to first internal electrode 31A changes in one or both of the first direction and the second direction due to a manufacturing dimensional error or the like, it is possible to reduce a possibility that an area of an overlapping portion between first internal electrode 31A and facing part 335 on the left side changes. Therefore, it is possible to reduce a possibility that an electrostatic capacitance of first varistor B1 changes due to a manufacturing dimensional error or the like. Similarly, even though a position of facing part 335 on a right side with respect to second internal electrode 32A changes in one or both of the first direction and the second direction due to a manufacturing dimensional error or the like, it is possible to reduce a possibility that an area of an overlapping portion between second internal electrode 32A and facing part 335 on the right side changes.

Therefore, it is possible to reduce a possibility that an electrostatic capacitance of second varistor B2 changes due to a manufacturing dimensional error or the like. As a result, according to laminated varistor 1A of the present exemplary embodiment, it is possible to reduce variations in electrostatic capacitance of two varistors (first varistor B1 and second varistor B2) caused by a dimensional error in manufacturing or the like.

(2.2) Details

Laminated varistor 1A of the second exemplary embodiment will be described in detail with reference to FIGS. 12 and 13.

As described above, laminated varistor 1A includes sintered body 10 having a laminated structure in which a plurality of layers are laminated. Sintered body 10 contains a semiconductor ceramic component having non-linear resistance characteristics. Sintered body 10 is formed by, for example, laminating and then sintering three layers LY1 to LY3 (see FIG. 13) containing ZnO as the main component.

First to third internal electrodes 31A to 33A are provided inside sintered body 10. First to third internal electrodes 31A to 33A contain, for example, Ag, Pd, PdAg, PtAg, or the like. Sintered body 10 has, for example, a laminated structure in which three layers LY1 to LY3 are laminated in the third direction, third internal electrode 33A is formed on the upper surface of layer LY1, and first and second internal electrodes 31A, 32A are formed on the upper surface of layer LY2. That is, sintered body 10 is formed by laminating and firing a ceramic sheet to be layer LY1 to which an electrode material for forming third internal electrode 33A is applied, a ceramic sheet to be layer LY2 to which an electrode material for forming first internal electrode 31A and second internal electrode 32A is applied, and a ceramic sheet to be layer LY3. As a result, inside sintered body 10, third internal electrode 33A is provided between layer LY1 and layer LY2, and first internal electrode 31A and second internal electrode 32A are provided between layer LY2 and layer LY3.

First internal electrode 31A is formed in a rectangular plate shape, and protrudes from first end surface 11 toward second end surface 12. An end surface of first internal electrode 31A is exposed to first end surface 11, and an end surface of first internal electrode 31A is connected to first external electrode 21.

Second internal electrode 32A is formed in a rectangular plate shape, and protrudes from second end surface 12 toward first end surface 11. An end surface of second internal electrode 32A is exposed to second end surface 12, and an end surface of second internal electrode 32A is connected to second external electrode 22.

Third internal electrode 33A includes a pair of facing parts 335, a first coupling part 336, a second coupling part 337, and a pair of connecting parts 338.

Each of the pair of facing parts 335 is formed in a rectangular plate shape extending along the second direction. Of the pair of facing parts 335, one facing part 335 is provided at a position overlapping first internal electrode 31A in the third direction, and other facing part 335 is provided at a position overlapping second internal electrode 32A in the third direction.

First coupling part 336 is formed in a rectangular plate shape. First coupling part 336 is disposed along the first direction and connects ends of the pair of facing parts 335 on first side surface 13 side.

A central portion of first coupling part 336 in the first direction is connected to third external electrode 23 provided on first side surface 13 via connecting part 338. That is, an end surface of connecting part 338 protruding forward from first coupling part 336 is exposed to first side surface 13, and the end surface of connecting part 338 is connected to third external electrode 23 provided on first side surface 13.

A central portion of second coupling part 337 in the first direction is connected to third external electrode 23 provided on second side surface 14 via connecting part 338. That is, an end surface of connecting part 338 protruding rearward from second coupling part 337 is exposed to second side surface 14, and the end surface of connecting part 338 is connected to third external electrode 23 provided on second side surface 14.

First external electrode 21 is provided on first end surface 11 of sintered body 10. First external electrode 21 is connected to the end surface of first internal electrode 31A exposed to first end surface 11, and first external electrode 21 is electrically connected to first internal electrode 31A.

Second external electrode 22 is provided on second end surface 12 of sintered body 10. Second external electrode 22 is connected to the end surface of second internal electrode 32A exposed to second end surface 12, and second external electrode 22 is electrically connected to second internal electrode 32A.

On first side surface 13 and second side surface 14 of sintered body 10, a pair of third external electrodes 23 is provided at a central portion in the first direction. Third external electrode 23 provided on first side surface 13 is connected to the end surface of connecting part 338 exposed to first side surface 13. As a result, third external electrode 23 provided on first side surface 13 is electrically connected to third internal electrode 33A. Third external electrode 23 provided on second side surface 14 is connected to the end surface of connecting part 338 exposed on second side surface 14. As a result, third external electrode 23 provided on second side surface 14 is electrically connected to third internal electrode 33A. That is, the pair of third external electrodes 23 is electrically connected to third internal electrode 33A.

Laminated varistor 1A of the present exemplary embodiment includes first varistor B1 formed between first external electrode 21 and third external electrode 23, and second varistor B2 formed between second external electrode 22 and third external electrode 23. An electrostatic capacitance of each of first varistor B1 and second varistor B2 is preferably less than or equal to 200 pF, and a difference (absolute value) between the electrostatic capacitance of first varistor B1 and the electrostatic capacitance of second varistor B2 is preferably less than or equal to 20% of the electrostatic capacitance of first varistor B1. As a result, in a case where laminated varistor 1A is connected to a communication IC that performs high frequency communication, it is possible to suppress crosstalk and improve communication quality.

Note that, since a method for manufacturing laminated varistor 1A of the present exemplary embodiment is similar to the method for manufacturing laminated varistor 1 of the first exemplary embodiment, the description thereof will be omitted.

(2.3) Modifications

The above second exemplary embodiment is merely one of various exemplary embodiments of the present disclosure. The above second exemplary embodiment can be variously changed according to a design and the like as long as the object of the present disclosure can be achieved.

Hereinafter, modifications of the second exemplary embodiment will be listed. The modifications to be described below can be applied in appropriate combination. In addition, in the modifications to be described below, the same reference numerals are given to the components common to the above second exemplary embodiment, and the description thereof will be omitted.

(2.3.1) First Modification

Laminated varistor 1A according to a first modification of the second exemplary embodiment will be described with reference to FIG. 14. Laminated varistor 1A according to the first modification is different from laminated varistor 1A according to the second exemplary embodiment in that shapes of corner portions 339A, 339B of third internal electrode 33A as viewed from the third direction are chamfered shapes in which corners of corner portions 339A, 339B are chamfered. Note that, since laminated varistor 1A according to the first modification is similar to the above second exemplary embodiment except for the shape of third internal electrode 33A, the same reference numerals are given to the components common to the second exemplary embodiment, and the description thereof will be omitted.

Third internal electrode 33A included in laminated varistor 1A of the first modification includes a pair of facing parts 335, first coupling part 336, and second coupling part 337.

Each of the pair of facing parts 335 is formed in a rectangular plate shape extending along the second direction.

First coupling part 336 couples ends of the pair of facing parts 335 on first side surface 13 side, and is connected to third external electrode 23 provided on first side surface 13.

Second coupling part 337 couples ends of the pair of facing parts 335 on second side surface 14 side, and is connected to third external electrode 23 provided on second side surface 14.

Third internal electrode 33A has two corner portions 339A facing first external electrode 21 and two corner portions 339B facing second external electrode 22.

Two corner portions 339A include a first corner portion formed by facing part 335 of the pair of facing parts 335 present at a position (that is, left side) close to first external electrode 21 and first coupling part 336, and a second corner portion formed by facing part 335 on a left side and second coupling part 337. More specifically, the first corner portion is a corner portion formed by a side of facing part 335 on the left side closer on first external electrode 21 side and a side of first coupling part 336 on first side surface 13 side. The second corner portion is a corner portion formed by a side of facing part 335 on the left side on first external electrode 21 side and a side of second coupling part 337 on second side surface 14 side.

Two corner portions 339B include a third corner portion formed by facing part 335 of the pair of facing parts 335 present at a position (that is, right side) close to second external electrode 22 and first coupling part 336, and a fourth corner portion formed by facing part 335 on the right side and second coupling part 337. More specifically, the third corner portion is a corner portion formed by a side of facing part 335 on the right side on second external electrode 22 side and a side of first coupling part 336 on first side surface 13 side. The fourth corner portion is a corner portion formed by a side of facing part 335 on the right side on second external electrode 22 side and a side of second coupling part 337 on second side surface 14 side.

In addition, a case where the shapes of the first corner portion and the second corner portion which are corner portions 339A are the "chamfered shapes" means that the first corner portion and the second corner portion have a C-chamfered shape in which the first corner portion and the second corner portion are cut off on a plane obliquely intersecting a side of facing part 335 on the left side on first external electrode 21 side, or an R-chamfered shape in which an angle formed by two sides is rounded. Similarly, a case where the shapes of the third corner portion and the fourth corner portion which are corner portions 339B are the "chamfered shapes" means that the third corner portion and the fourth corner portion have a C-chamfered shape in which the third corner portion and the fourth corner portion are cut off on a plane obliquely intersecting a side of facing part 335 on the right side on second external electrode 22 side, or an R-chamfered shape in which an angle formed by two sides is rounded.

Figure 14:
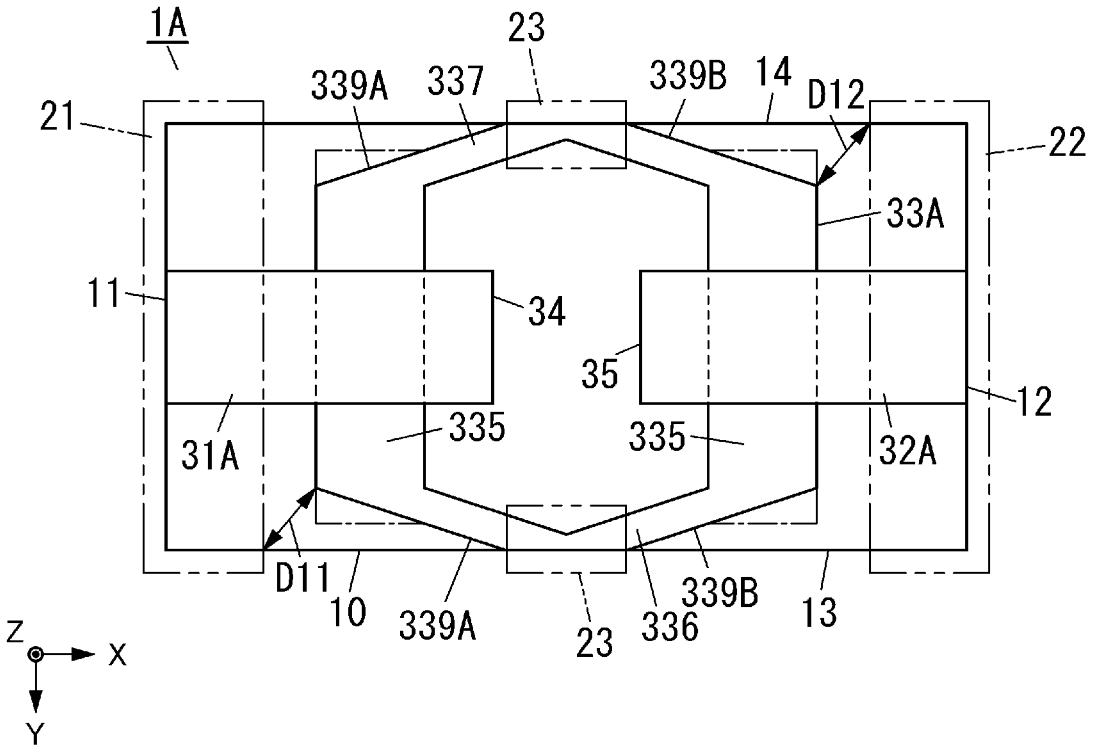
FIG. 14 is a transparent view of a laminated varistor according to a first modification of the second exemplary embodiment from above.

Laminated varistor 1A of the first modification illustrated in FIG. 14 is an example in which corner portions 339A, 339B of third internal electrode 33A have the C-chamfered shapes. As described above, corner portions 339A, 339B are formed into the C-chamfered shapes, and thus, distance D11 between first external electrode 21 and third internal electrode 33A and distance D12 between second external electrode 22 and third internal electrode 33A can be set to longer than in a case where the chamfered shape is not provided. Note that, distances D11, D12 are shortest distances between first external electrode 21 and second external electrode 22, and third internal electrode 33 A.

In laminated varistor 1A of the first modification, corner portions 339A, 339B are formed into the chamfered shapes, and thus, distances D11, D12 between first external electrode 21 and second external electrode 22, and third internal electrode 33A can be set to be longer than in a case where the chamfered shape is not provided. Accordingly, it is possible to reduce crosstalk generated between first external electrode 21 and second external electrode 22, and third internal electrode 33A. In addition, it is also possible to reduce a difference in electrostatic capacitance between first varistor B1 and second varistor B2 caused by a dimensional error or the like of first to third internal electrodes 31A to 33A and first to third external electrodes 21 to 23. In addition, it is possible to reduce a stray capacitance generated between first external electrode 21 and third internal electrode 33A and a stray capacitance generated between second external electrode 22 and third internal electrode 33A.

Figure 15:
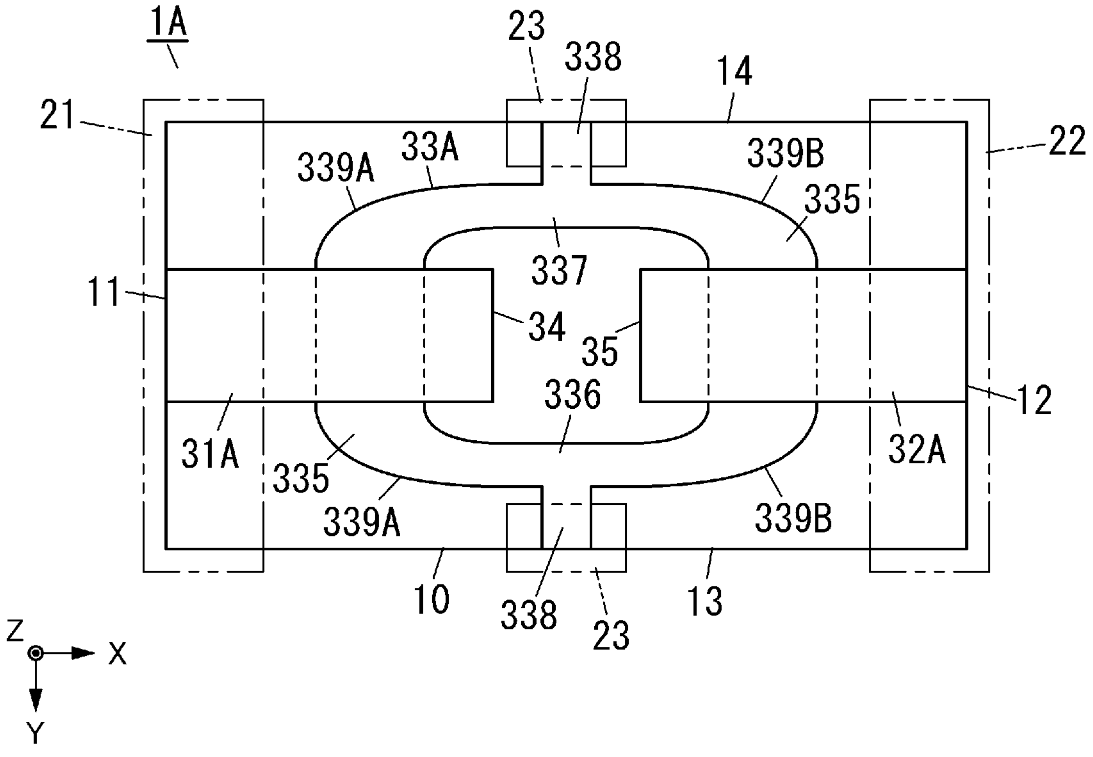
FIG. 15 is a transparent view of the laminated varistor according to the first modification of the second exemplary embodiment from above.

Note that, the chamfered shapes provided at corner portions 339A, 339B of third internal electrode 33A are not limited to the C-chamfered shapes, and can be appropriately changed. For example, as illustrated in FIG. 15, the shapes of corner portions 339A, 339B of third internal electrode 33A as viewed from the third direction may be the R-chamfered shapes.

(2.3.2) Second Modification

Figure 16:
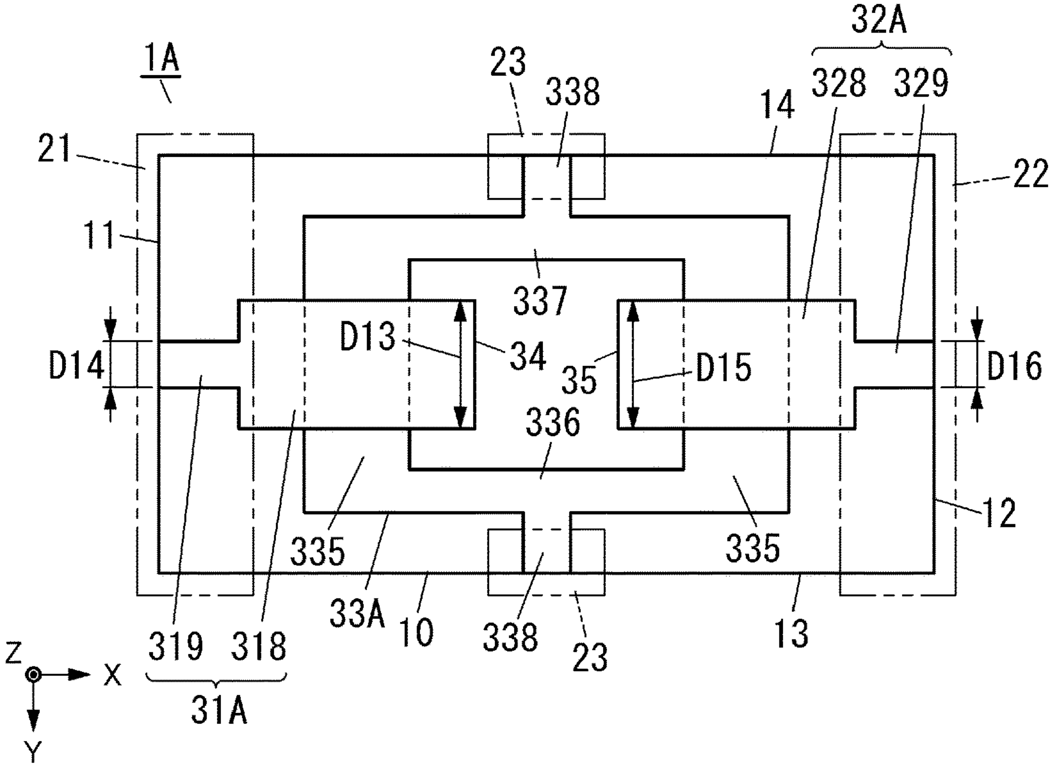
FIG. 16 is a transparent view of a laminated varistor according to a second modification of the second exemplary embodiment from above.

Laminated varistor 1A according to a second modification of the second exemplary embodiment will be described with reference to FIG. 16. In laminated varistor 1A according to the second modification, first internal electrode 31A includes first facing part 318 facing third internal electrode 33A, and first connecting part 319 connecting first facing part 318 and first external electrode 21. Second internal electrode 32A includes second facing part 328 facing third internal electrode 33A, and second connecting part 329 connecting second facing part 328 and second external electrode 22. Here, dimension D14 of first connecting part 319 in the second direction is smaller than dimension D13 of first facing part 318 in the second direction, and dimension D16 of second connecting part 329 in the second direction is smaller than dimension D15 of second facing part 328 in the second direction. Note that, since laminated varistor 1A according to the second modification is similar to the above second exemplary embodiment except for the shapes of first internal electrode 31A and second internal electrode 32A, the same reference numerals are given to the components common to the second exemplary embodiment, and the description thereof will be omitted.

In laminated varistor 1A of the above second exemplary embodiment, although first internal electrode 31A is formed in the rectangular plate shape, in the present modification, a width of first connecting part 319 in the second direction connected to first external electrode 21 in first internal electrode 31A is smaller than a width of first facing part 318 in the second direction. In addition, in second internal electrode 32A, a width of second connecting part 329 in the second direction connected to second external electrode 22 is smaller than a width of second facing part 328 in the second direction. As a result, there is an advantage that it is possible to reduce crosstalk generated between first internal electrode 31A and third internal electrode 33A and crosstalk generated between second internal electrode 32A and third internal electrode 33A. In addition, it is also possible to reduce a difference in electrostatic capacitance between first varistor B1 and second varistor B2 caused by a dimensional error or the like of first to third internal electrodes 31A to 33A and first to third external electrodes 21 to 23.

Note that, in the present modification, although first connecting part 319 and second connecting part 329 are formed in the rectangular plate shape, the shapes of first connecting part 319 and second connecting part 329 are not limited to the illustrated shapes. First connecting part 319 may be formed in such a shape that dimension D14 in the second direction gradually increases toward first end surface 11. In addition, second connecting part 329 may be formed in such a shape that dimension D16 in the second direction gradually increases toward second end surface 12.

(2.3.3) Third Modification

Figure 17:
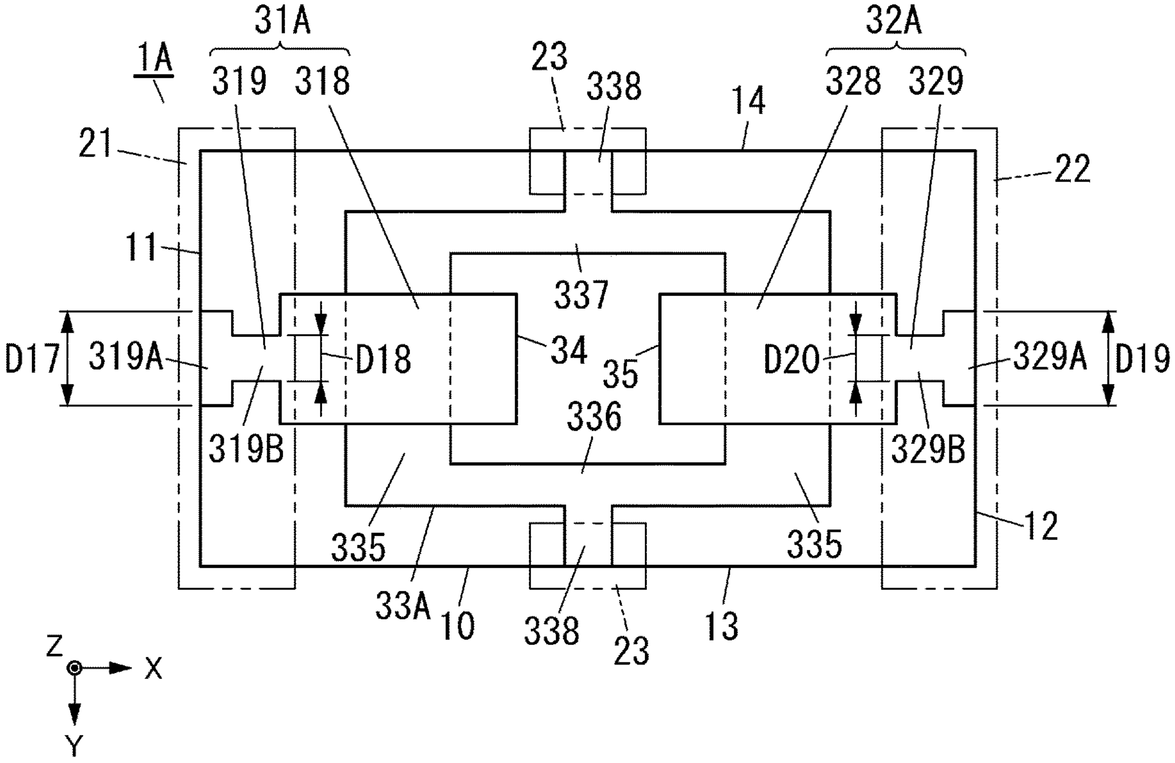
FIG. 17 is a transparent view of a laminated varistor according to a third modification of the second exemplary embodiment from above.

Laminated varistor 1A according to a third modification of the second exemplary embodiment will be described with reference to FIG. 17. In laminated varistor 1A according to the third modification, first connecting part 319 includes first connection portion 319A connected to first external electrode 21 and first narrow part 319B having a dimension in the second direction smaller than first connection portion 319A. In addition, second connecting part 329 includes second connection portion 329A connected to second external electrode 22, and second narrow part 329B having a dimension in the second direction smaller than second connection portion 329A. Note that, since laminated varistor 1A according to the third modification is similar to the above second modification except for the shapes of first connecting part 319 and second connecting part 329, the same reference numerals are given to the components common to the second modification, and the description thereof will be omitted.

In the third modification, in first connecting part 319, dimension D17 of first connection portion 319A in the second direction connected to first external electrode 21 is larger than dimension D18 of first narrow part 319B in the second direction, a connection state between first internal electrode 31A and first external electrode 21 is stabilized and the reliability of the electrical connection is improved as compared with a case where there is no wide first connection portion 319A. Note that, since a width of first narrow part 319B in the second direction is smaller than a width of first facing part 318 in the second direction, it is possible to suppress the occurrence of crosstalk.

Similarly, in second connecting part 329, since dimension D19 of second connection portion 329A in the second direction connected to second external electrode 22 is larger than dimension D20 of second narrow part 329B in the second direction, a connection state between second internal electrode 32A and second external electrode 22 is stabilized and the reliability of the electrical connection is improved as compared with a case where there is no wide second connection portion 329A. Note that, since a width of second narrow part 329B in the second direction is smaller than a width of second facing part 328 in the second direction, it is possible to suppress the occurrence of crosstalk.

Note that, although the shapes of first connection portion 319A and second connection portion 329A are rectangular plate shapes, the shapes of first connection portion 319A and second connection portion 329A can be appropriately changed. For example, first connection portion 319A may be formed in such a shape that dimension D17 in the second direction gradually increases toward first end surface 11. In addition, for example, second connection portion 329A may be formed in such a shape that dimension D19 in the second direction gradually increases toward second end surface 12.

(2.3.4) Fourth Modification

Figure 18:
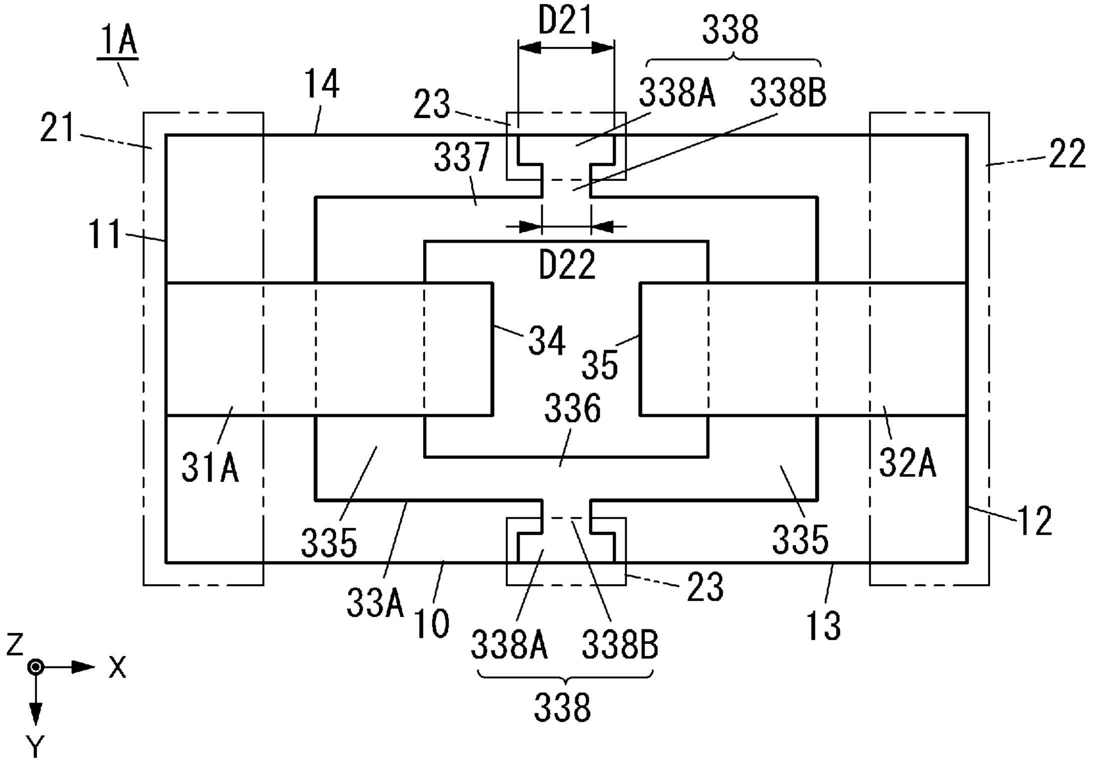
FIG. 18 is a transparent view of a laminated varistor according to a fourth modification of the second exemplary embodiment from above.

Laminated varistor 1A according to a fourth modification of the second exemplary embodiment will be described with reference to FIG. 18. In laminated varistor 1A according to the fourth modification, each of the pair of connecting parts 338 has connection portion 338A connected to third external electrode 23 and narrow part 338B having a dimension in the first direction smaller than connection portion 338A. Note that, since laminated varistor 1A according to the fourth modification is similar to the above second exemplary embodiment except for the shape of connecting part 338, the same reference numerals are given to the components common to the second exemplary embodiment, and the description thereof will be omitted.

In the fourth modification, in connecting part 338, since dimension D21 of connection portion 338A in the first direction connected to third external electrode 23 is larger than dimension D22 of narrow part 338B in the first direction, a connection state between third internal electrode 33A and third external electrode 23 is stabilized and the reliability of the electrical connection is improved as compared with a case where there is no wide connection portion 338A.

Note that, although the shape of connection portion 338A is the rectangular plate shape, the shape of connection portion 338A can be appropriately changed. For example, connection portion 338A may be formed in such a shape that dimension D21 in the first direction gradually increases toward first side surface 13 or second side surface 14.

(2.3.5) Fifth Modification

Figure 19:
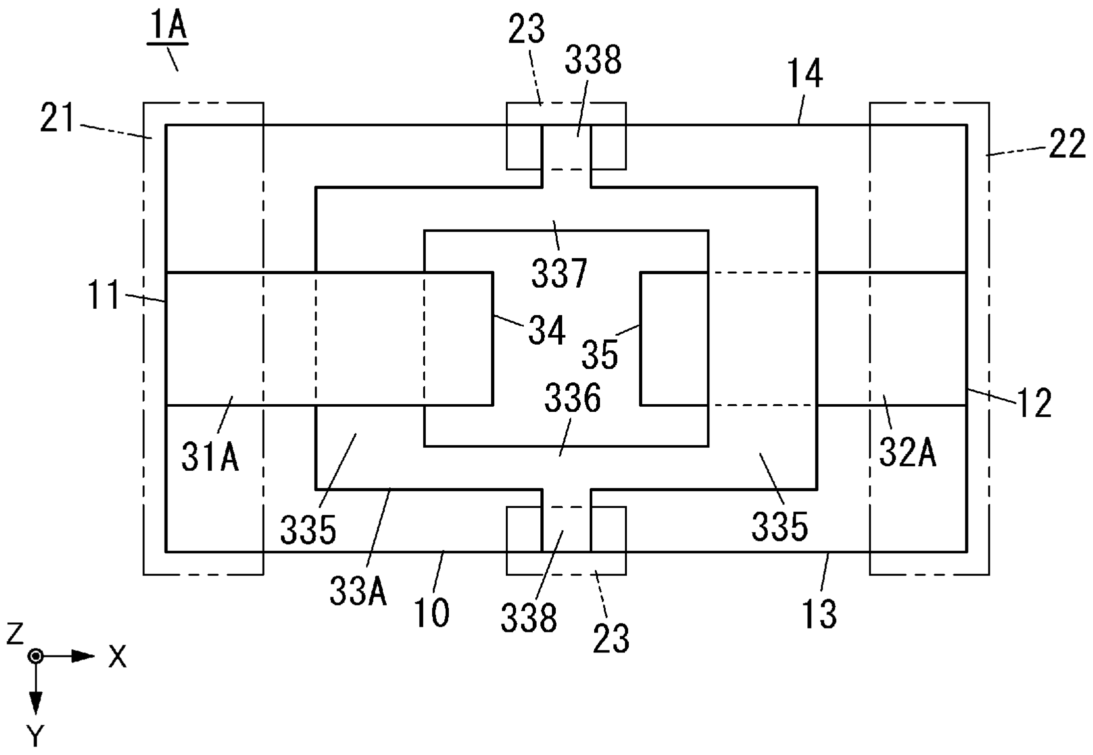
FIG. 19 is a transparent view of a laminated varistor according to a fifth modification of the second exemplary embodiment from above.

Laminated varistor 1A according to a fifth modification of the second exemplary embodiment will be described with reference to FIG. 19. In laminated varistor 1A according to the fifth modification, a layer in which first internal electrode

31A is formed and a layer in which second internal electrode 32A is formed are different from each other. Note that, laminated varistor 1A according to the fifth modification is different from the second exemplary embodiment in the laminated structure of sintered body 10. Since laminated varistor 1A according to the fifth modification has a configuration as similar to the above second exemplary embodiment except for the laminated structure of sintered body 10, the same reference numerals are given to the components common to the second exemplary embodiment, and the description thereof will be omitted.

As in the sixth modification of the first exemplary embodiment, in the present modification, sintered body 10 has a laminated structure in which four layers LY1 to LY4 are laminated along the third direction (see FIG. 11). Then, second internal electrode 32A is provided on the upper surface of layer LY1, third internal electrode 33A is provided on the upper surface of layer LY2, and first internal electrode 31A is provided on the upper surface of layer LY3.

As a result, first internal electrode 31A is disposed above facing part 335 on the left side of third internal electrode 33A, and second internal electrode 32A is disposed below facing part 335 on the right side of third internal electrode 33A. In addition, second internal electrode 32A is disposed at a position different from an overlapping range overlapping first internal electrode 31A in the third direction.

As described above, in the present modification, since layer LY3 in which first internal electrode 31A is formed, layer LY2 in which third internal electrode 33A is formed, and layer LY1 in which second internal electrode 32A is formed are different layers from each other, it is possible to reduce crosstalk generated between first external electrode 21 and second external electrode 22. Accordingly, it is possible to reduce a difference in electrostatic capacitance between first varistor B1 and second varistor B2 caused by a dimensional error or the like of first to third internal electrodes 31A to 33A and first to third external electrodes 21 to 23.

(2.3.6) Other Modifications

The shape of sintered body 10, the shapes and dispositions of first to third external electrodes 21 to 23, and the shape and dispositions of first to third internal electrodes 31A to 33A described in the above second exemplary embodiment and the first to fifth modifications are examples, and can be appropriately changed.

In the above second exemplary embodiment and the first to fifth modifications, although the pair of third external electrodes 23 is formed on both first side surface 13 and second side surface 14, third external electrode 23 may be formed on either one of first side surface 13 and second side surface 14. In this case, third internal electrode 33A may include one connecting part 338 connecting third external electrode 23 formed on either one of first side surface 13 and second side surface 14 and first coupling part 336 or the second coupling part 337.

CONCLUSION

The following aspects are disclosed based on the exemplary embodiment and the like described above.

Laminated varistor (1) according to a first aspect includes sintered body (10), first internal electrode (31), second internal electrode (32), and third internal electrode (33) that are provided inside sintered body (10), first external electrode (21), second external electrode (22), and third external electrode (23). Sintered body (10) includes first end surface (11) and second end surface (12) facing each other in a first direction, first side surface (13) and second side surface (14) facing each other in a second direction intersecting the first direction, and first principal surface (15) and second principal surface (16) facing each other in a third direction intersecting the first direction and the second direction. Sintered body (10) has a laminated structure in which a plurality of layers are laminated along the third direction. First external electrode (21) is provided on first end surface (11) to be connected to first internal electrode (31). Second external electrode (22) is provided on second end surface (12) to be connected to second internal electrode (32). Third external electrode (23) is provided on at least one of first side surface (13) and second side surface (14) to be connected to third internal electrode (33). First internal electrode (31) has a pair of first connecting parts (311) and first facing part (312). The pair of first connecting parts (311) extends from first end surface (11) along the first direction, and is connected to first external electrode (21). First facing part (312) is disposed along the second direction and is provided between the pair of first connecting parts (311). Second internal electrode (32) has a pair of second connecting parts (321) and second facing part (322). The pair of second connecting parts (321) extends from second end surface (12) along the first direction, and is connected to second external electrode (22). Second facing part (322) is disposed along the second direction and is provided between the pair of second connecting parts (321). Third internal electrode (33) includes third facing part (332) disposed along the first direction, and third connecting part (331) that connects third external electrode (23) provided on at least one of first side surface (13) and second side surface (14) and third facing part (332). Third facing part (332) overlaps a part of first facing part (312) and a part of second facing part (322) in the third direction. First end (332A) of third facing part (332) in the first direction is disposed between the pair of first connecting parts (311), and second end (332B) of third facing part (332) in the first direction is disposed between the pair of second connecting parts (321).

According to this aspect, it is possible to reduce variations in electrostatic capacitance between two varistors (that is, a varistor formed between first external electrode (21) and third external electrode (23), and a varistor formed between second external electrode (22) and third external electrode (23)).

In the first aspect, in laminated varistor (1) according to a second aspect, second internal electrode (32) is disposed at a position different from an overlapping range overlapping first internal electrode (31) in the third direction.

According to this aspect, it is possible to reduce crosstalk generated between first external electrode (21) and second external electrode (22).

In the first or second aspect, in laminated varistor (1) according to a third aspect, shapes of corner portions (314, 324) of first internal electrode (31) and second internal electrode (32) facing third external electrode (23) as viewed from the third direction are chamfered shapes in which corners of corner portions (314, 324) are chamfered.

According to this aspect, it is possible to reduce a stray capacitance generated between first internal electrode (31) and third external electrode (23) and a stray capacitance generated between second internal electrode (32) and third external electrode (23).

In any one of the first to third aspects, in laminated varistor (1) according to a fourth aspect, third facing part (332) includes a pair of overlapping portions (3221) overlapping first facing part (312) and second facing part (322) in the third direction, and intermediate portion (3222) between the pair of overlapping portions (3221). A dimension of intermediate portion (3222) in the second direction is smaller than a dimension of the pair of overlapping portions (3221) in the second direction.

According to this aspect, it is possible to reduce crosstalk generated between first external electrode (21) and second external electrode (22).

In any one of the first to fourth aspects, in laminated varistor (1) according to a fifth aspect, first internal electrode (31) further includes first electrode connecting part (315), and second internal electrode (32) further includes second electrode connecting part (325). First electrode connecting part (315) is provided along first end surface (11), couples the pair of first connecting parts (311), and is connected to first external electrode (21). Second electrode connecting part (325) is provided along second end surface (12), couples the pair of second connecting parts (321), and is connected to second external electrode (22).

According to this aspect, there is an advantage that a connection state between first internal electrode (31) and first external electrode (21) is stabilized and a connection state between second internal electrode (32) and second external electrode (22) is stabilized.

In any one of the first to fifth aspects, in laminated varistor (1) according to a sixth aspect, each of the pair of first connecting parts (311) has first connection portion (316) connected to first external electrode (21) and first narrow part (317) having a dimension in the second direction smaller than first connection portion (316). Each of the pair of second connecting parts (321) includes second connection portion (326) connected to second external electrode (22) and second narrow part (327) having a dimension in the second direction smaller than second connection portion (326).

According to this aspect, there is an advantage that a connection state between first internal electrode (31) and first external electrode (21) is stabilized while the occurrence of crosstalk is suppressed and a connection state between second internal electrode (32) and second external electrode (22) is stabilized.

In any one of the first to sixth aspects, in laminated varistor (1) according to a seventh aspect, third connecting part (331) includes third connection portion (333) connected to third external electrode (23) and third narrow part (334) having a dimension in the first direction smaller than third connection portion (333).

According to this aspect, there is an advantage that a connection state between third internal electrode (33) and third external electrode (23) is stabilized while the occurrence of crosstalk is suppressed.

Laminated varistor (1A) according to an eighth aspect includes sintered body (10), first internal electrode (31A), second internal electrode (32A), and third internal electrode (33A) that are provided inside sintered body (10), first external electrode (21), second external electrode (22), and third external electrode (23). Sintered body (10) includes first end surface (11) and second end surface (12) facing each other in a first direction, first side surface (13) and second side surface (14) facing each other in a second direction intersecting the first direction, and first principal surface (15) and second principal surface (16) facing each other in a third direction intersecting the first direction and the second direction. Sintered body (10) has a laminated structure in which a plurality of layers are laminated along the third direction. First external electrode (21) is provided on first end surface (11) to be connected to first internal electrode (31A). Second external electrode (22) is provided on second end surface (12) to be connected to second internal electrode (32A). Third external electrode (23) is provided on at least one of first side surface (13) and second side surface (14) to be connected to third internal electrode (33A). First internal electrode (31A) extends from first end surface (11) along the first direction. Second internal electrode (32A) extends from second end surface (12) along the first direction. Third internal electrode (33A) includes a pair of facing parts (335) extending along the second direction, first coupling part (336), second coupling part (337), and connecting part (338). First coupling part (336) couples first ends of the pair of facing parts (335) close to first side surface (13). Second coupling part (337) couples second ends of the pair of facing parts (335) close to second side surface (14). Connecting part (338) connects at least one of first coupling part (336) and second coupling part (337) and third external electrode (23). In the third direction, at least a part of one of the pair of facing parts (335) overlaps first internal electrode (31A), and at least a part of the other of the pair of facing parts (335) overlaps second internal electrode (32A). Inside sintered body (10), second internal electrode (32A) is disposed at a position different from an overlapping range overlapping first internal electrode (31A) in the third direction. End (34) of first internal electrode (31A) and end (35) of second internal electrode (32A) are disposed between first coupling part (336) and second coupling part (337).

According to this aspect, it is possible to reduce variations in electrostatic capacitance between two varistors (that is, a varistor formed between first external electrode (21) and third external electrode (23), and a varistor formed between second external electrode (22) and third external electrode (23)).

In the eighth aspect, in laminated varistor (1A) according to a ninth aspect, shapes of corner portions (339A, 339B) of third internal electrode (33A) as viewed from the third direction are chamfered shapes in which corners of corner portions (339A, 339B) are chamfered.

According to this aspect, it is possible to reduce a stray capacitance generated between first external electrode (21) and third internal electrode (33A) and a stray capacitance generated between second external electrode (22) and third internal electrode (33A).

In the eighth or ninth aspect, in laminated varistor (1A) according to a tenth aspect, first internal electrode (31A) includes first facing part (318) that faces third internal electrode (33A) and first connecting part (319) that connects first facing part (318) and first external electrode (21). Second internal electrode (32A) includes second facing part (328) that faces third internal electrode (33A), and second connecting part (329) that connects second facing part (328) and second external electrode (22). A dimension of first connecting part (319) in the second direction is smaller than a dimension of first facing part (318) in the second direction. A dimension of second connecting part (329) in the second direction is smaller than a dimension of second facing part (328) in the second direction.

According to this aspect, it is possible to suppress the occurrence of crosstalk.

In the tenth aspect, in laminated varistor (1A) according to an eleventh aspect, first connecting part (319) includes first connection portion (319A) connected to first external electrode (21) and first narrow part (319B) having a dimension in the second direction smaller than first connection portion (319A). Second connecting part (329) includes second connection portion (329A) connected to second external electrode (22) and second narrow part (329B) having a dimension in the second direction smaller than second connection portion (329A).

According to this aspect, there is an advantage that a connection state between first internal electrode (31A) and first external electrode (21) is stabilized while the occurrence of crosstalk is suppressed and a connection state between second internal electrode (32A) and second external electrode (22) is stabilized.

In any one of the eighth to eleventh aspects, in laminated varistor (1A) according to a twelfth aspect, connecting part (338) has connection portion (338A) connected to third external electrode (23) and narrow part (338B) having a dimension in the first direction smaller than connection portion (338A).

According to this aspect, there is an advantage that a connection state between third internal electrode (33A) and third external electrode (23) is stabilized while the occurrence of crosstalk is suppressed.

In any one of the first to twelfth aspects, in laminated varistor (1, 1A) according to a thirteenth aspect, third external electrode (23) is disposed on either one of first side surface (13) and second side surface (14).

According to this aspect, it is possible to reduce variations in electrostatic capacitance between two varistors.

In any one of the first to thirteen aspects, in laminated varistor (1, 1A) according to a fourteenth aspect, a layer in which first internal electrode (31, 31A) is disposed and a layer in which second internal electrode (32, 32A) is disposed are different from each other.

According to this aspect, it is possible to suppress crosstalk generated between first external electrode (21) and second external electrode (22).

In any one of the first to fourteenth aspects, laminated varistor (1, 1A) according to a fifteenth aspect includes first varistor (B1) disposed between first external electrode (21) and third external electrode (23), and second varistor (B2) disposed between second external electrode (22) and third external electrode (23). An electrostatic capacitance of each of first varistor (B1) and second varistor (B2) is less than or equal to 200 pF. A difference between the electrostatic capacitance of first varistor (B1) and the electrostatic capacitance of second varistor (B2) is less than or equal to 20% of the electrostatic capacitance of first varistor (B1).

According to this aspect, it is possible to suppress crosstalk and improve communication quality in a circuit using laminated varistor (1, 1A).

The configurations according to the second to seventh aspects and the thirteenth to fifteenth aspects are not essential configurations for laminated varistor (1) according to the first aspect, and can be appropriately omitted.

In addition, the configurations according to the ninth to fifteenth aspects are not essential configurations for laminated varistor (1A) according to the eighth aspect, and can be appropriately omitted.

What is claimed is:

1. A laminated varistor comprising:
a sintered body that includes
a first end surface and a second end surface facing each other in a first direction,
a first side surface and a second side surface facing each other in a second direction intersecting the first direction, and
a first principal surface and a second principal surface facing each other in a third direction intersecting the first direction and the second direction,
the sintered body having a laminated structure including a plurality of layers laminated along the third direction;
only a first internal electrode, a second internal electrode, and a third internal electrode that are provided inside the sintered body as internal electrodes;
a first external electrode that is provided on the first end surface to be connected to the first internal electrode;
a second external electrode that is provided on the second end surface to be connected to the second internal electrode; and
a third external electrode that is provided on at least one of the first side surface and the second side surface to be connected to the third internal electrode,
wherein
the first internal electrode includes
a pair of first connecting parts extending from the first end surface along the first direction to be connected to the first external electrode, and
a first facing part disposed along the second direction and provided between the pair of first connecting parts,
the second internal electrode includes
a pair of second connecting parts extending from the second end surface along the first direction to be connected to the second external electrode, and
a second facing part disposed along the second direction and provided between the pair of second connecting parts,
the third internal electrode includes
a third facing part disposed along the first direction, and
a third connecting part connected between the third external electrode provided on
at least one of the first side surface and the second side surface and the third facing part,
the third facing part overlaps a part of the first facing part and a part of the second facing part in the third direction,
a first end of the third facing part in the first direction is disposed between the pair of first connecting parts, and a second end of the third facing part in the first direction is disposed between the pair of second connecting parts, and
the third internal electrode is disposed facing the first internal electrode and the second internal electrode in the third direction, the first internal electrode and the second internal electrode being disposed on a same side of the third internal electrode in the third direction.

2. The laminated varistor according to claim 1, wherein the second internal electrode is disposed at a position different from an overlapping range overlapping the first internal electrode in the third direction.

3. The laminated varistor according to claim 1, wherein shapes of corner portions of the first internal electrode and the second internal electrode facing the third external electrode as viewed from the third direction are chamfered shapes in which corners of the corner portions are chamfered.

4. The laminated varistor according to claim 1, wherein the third facing part includes a pair of overlapping portions overlapping the first facing part and the second facing part in the third direction and an intermediate portion between the pair of overlapping portions, and a dimension of the intermediate portion in the second direction is smaller than a dimension of the pair of overlapping portions in the second direction.

5. The laminated varistor according to claim 1, wherein the first internal electrode further includes a first electrode connecting part,
the second internal electrode further includes a second electrode connecting part,
the first electrode connecting part is provided along the first end surface, couples the pair of first connecting parts, and is connected to the first external electrode, and
the second electrode connecting part is provided along the second end surface, couples the pair of second connecting parts, and is connected to the second external electrode.

6. The laminated varistor according to claim 1, wherein each of the pair of first connecting parts includes a first connection portion connected to the first external electrode and a first narrow part having a dimension in the second direction smaller than the first connection portion, and
each of the pair of second connecting parts includes a second connection portion connected to the second external electrode, and a second narrow part having a dimension in the second direction smaller than the second connection portion.

7. The laminated varistor according to claim 1, wherein the third connecting part includes a third connection portion connected to the third external electrode, and a third narrow part having a dimension in the first direction smaller than the third connection portion.

8. The laminated varistor according to claim 1, wherein the third external electrode is disposed on either one of the first side surface and the second side surface.

9. The laminated varistor according to claim 1, wherein a layer in which the first internal electrode is disposed and a layer in which the second internal electrode is disposed are different from each other.

10. The laminated varistor according to claim 1, further comprising:
a first varistor that is disposed between the first external electrode and the third external electrode; and
a second varistor that is disposed between the second external electrode and the third external electrode,
wherein
an electrostatic capacitance of each of the first varistor and the second varistor is less than or equal to 200 pF, and
a difference between the electrostatic capacitance of the first varistor and the electrostatic capacitance of the second varistor is less than or equal to 20% of the electrostatic capacitance of the first varistor.

11. A laminated varistor comprising:
a sintered body that includes a first end surface and a second end surface facing each other in a first direction, a first side surface and a second side surface facing each other in a second direction intersecting the first direction, and a first principal surface and a second principal surface facing each other in a third direction intersecting the first direction and the second direction, the sintered body having a laminated structure in which a plurality of layers are laminated along the third direction;
only a first internal electrode, a second internal electrode, and a third internal electrode that are provided inside the sintered body as internal electrodes;
a first external electrode that is provided on the first end surface to be connected to the first internal electrode;
a second external electrode that is provided on the second end surface to be connected to the second internal electrode; and
a third external electrode that is provided on at least one of the first side surface and the second side surface to be connected to the third internal electrode,
wherein
the first internal electrode extends from the first end surface along the first direction,
the second internal electrode extends from the second end surface along the first direction,
the third internal electrode includes
a pair of facing parts extending along the second direction,
a first coupling part that couples first ends of the pair of facing parts close to the first side surface,
a second coupling part that couples second ends of the pair of facing parts close to the second side surface, and
a connecting part that connects at least one of the first coupling part and the second coupling part and the third external electrode,
in the third direction, at least a part of one of the pair of facing parts overlaps the first internal electrode, and at least a part of the other of the pair of facing parts overlaps the second internal electrode,
inside the sintered body, the second internal electrode is disposed at a position different from an overlapping range overlapping the first internal electrode in the third direction,
an end of the first internal electrode and an end of the second internal electrode are disposed between the first coupling part and the second coupling part, and
the third internal electrode is disposed facing the first internal electrode and the second internal electrode in the third direction, the first internal electrode and the second internal electrode being disposed on a same side of the third internal electrode in the third direction.

12. The laminated varistor according to claim 11, wherein a shape of a corner portion of the third internal electrode as viewed from the third direction is a chamfered shape in which a corner of the corner portion is chamfered.

13. The laminated varistor according to claim 11, wherein
the first internal electrode includes a first facing part that faces the third internal electrode, and a first connecting part that connects the first facing part and the first external electrode,
the second internal electrode includes a second facing part that faces the third internal electrode, and a second connecting part that connects the second facing part and the second external electrode,
a dimension of the first connecting part in the second direction is smaller than a dimension of the first facing part in the second direction, and
a dimension of the second connecting part in the second direction is smaller than a dimension of the second facing part in the second direction.

14. The laminated varistor according to claim 13, wherein
the first connecting part includes a first connection portion connected to the first external electrode, and a first narrow part having a dimension in the second direction smaller than the first connection portion, and
the second connecting part includes a second connection portion connected to the second external electrode, and a second narrow part having a dimension in the second direction smaller than the second connection portion.

15. The laminated varistor according to claim 11, wherein the connecting part includes a connection portion connected to the third external electrode, and a narrow part having a dimension in the first direction smaller than the connection portion.

* * * * *